United States Patent
McRae et al.

(10) Patent No.: US 10,497,016 B1
(45) Date of Patent: Dec. 3, 2019

(54) METHODS AND SYSTEMS FOR DISCOUNTS MANAGEMENT

(71) Applicant: JPMorgan Chase Bank, N.A., New York, NY (US)

(72) Inventors: Xuan McRae, Fremont, CA (US); Duc Lam, San Jose, CA (US); Matthew Roland, San Francisco, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 318 days.

(21) Appl. No.: 13/969,581

(22) Filed: Aug. 18, 2013

Related U.S. Application Data

(62) Division of application No. 11/002,334, filed on Dec. 1, 2004, now Pat. No. 8,554,673.

(60) Provisional application No. 60/581,022, filed on Jun. 17, 2004.

(51) Int. Cl.
*G06Q 30/02* (2012.01)
*G06Q 40/00* (2012.01)

(52) U.S. Cl.
CPC ......... *G06Q 30/0222* (2013.01); *G06Q 40/00* (2013.01)

(58) Field of Classification Search
CPC ....................................................... G06Q 10/00
USPC ........................................ 705/40, 34, 35, 39
See application file for complete search history.

(56) References Cited

U.S. PATENT DOCUMENTS

| | | | |
|---|---|---|---|
| 2,005,003 A | 6/1935 | Patton et al. | |
| 3,653,480 A | 4/1972 | Yamamoto et al. | |
| 3,938,090 A | 2/1976 | Borison et al. | |
| 4,050,375 A | 9/1977 | Orleans | |
| 4,141,078 A | 2/1979 | Bridges et al. | |
| 4,205,780 A | 6/1980 | Burns | |
| 4,264,808 A | 4/1981 | Ownes et al. | |
| 4,321,672 A | 3/1982 | Braun et al. | |
| 4,385,285 A | 5/1983 | Horst et al. | |
| 4,396,985 A | 8/1983 | Ohara | |
| 4,443,027 A | 4/1984 | McNeely et al. | |
| 4,453,074 A | 6/1984 | Weinstein | |
| 4,454,414 A | 6/1984 | Benton | |
| RE31,692 E | 10/1984 | Tyburski et al. | |
| 4,495,018 A | 1/1985 | Vohrer | |

(Continued)

FOREIGN PATENT DOCUMENTS

| | | |
|---|---|---|
| EP | 0421808 | 4/1991 |
| EP | 0665486 | 8/1995 |

(Continued)

OTHER PUBLICATIONS

Alabama Department of Revenue Selects Unisys for Imaging Solution to Speed Tax Returns, Bus. Wire, Sep. 6, 1995.

(Continued)

*Primary Examiner* — Kelly S Campen

(74) *Attorney, Agent, or Firm* — Greenblum & Bernstein, P.L.C.

(57) ABSTRACT

A computer-implemented method and electronic system are provided in which payment information is exchanged between a buyer and seller. A user interface is provided that facilitates seller selection of an identified payment date and amount for early payment. The system operates on the seller selections to identify invoices that may be discounted based on seller selections and offers the discount to the buyer.

10 Claims, 14 Drawing Sheets

(56) References Cited

U.S. PATENT DOCUMENTS

| | | |
|---|---|---|
| 4,575,621 A | 3/1986 | Dreifus |
| 4,605,844 A | 8/1986 | Haggan |
| 4,614,861 A | 9/1986 | Pavlov et al. |
| 4,617,457 A | 10/1986 | Myers |
| 4,650,981 A | 3/1987 | Foletta |
| 4,672,377 A | 6/1987 | Murphy |
| 4,694,397 A | 9/1987 | Grant et al. |
| 4,697,072 A | 9/1987 | Kawana |
| 4,700,055 A | 10/1987 | Kashkashian |
| 4,701,601 A | 10/1987 | Francini et al. |
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston et al. |
| 4,823,264 A | 4/1989 | Deming |
| 4,845,347 A | 7/1989 | McCrindle |
| 4,859,837 A | 8/1989 | Halpern |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,977,501 A | 12/1990 | Lefevre |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,072,380 A | 12/1991 | Randelman et al. |
| 5,080,748 A | 1/1992 | Bonomi |
| 5,097,115 A | 3/1992 | Ogasawara |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,224,034 A | 6/1993 | Katz et al. |
| 5,225,978 A | 7/1993 | Peterson |
| 5,237,159 A | 8/1993 | Stephens |
| 5,237,620 A | 8/1993 | Deaton |
| 5,257,486 A | 11/1993 | Holmwall |
| 5,265,007 A | 11/1993 | Barnhard, Jr. et al. |
| 5,276,311 A | 1/1994 | Hennige |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,351,187 A | 9/1994 | Hassett |
| 5,352,877 A | 10/1994 | Morley |
| 5,367,581 A | 11/1994 | Van Horn |
| 5,373,550 A | 12/1994 | Campbell |
| 5,382,784 A | 1/1995 | Eberhardt |
| 5,396,417 A | 3/1995 | Burks et al. |
| 5,402,474 A | 3/1995 | Miller |
| 5,430,644 A | 4/1995 | Deaton et al. |
| 5,412,190 A | 5/1995 | Kopesec |
| 5,424,938 A | 6/1995 | Wagner |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | LaLonde |
| 5,479,494 A | 12/1995 | Clitherow |
| 5,483,445 A | 1/1996 | Pickering |
| 5,484,988 A | 1/1996 | Hills |
| 5,495,981 A | 3/1996 | Warther |
| 5,500,890 A | 3/1996 | Rogge et al. |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,532,689 A | 7/1996 | Bueno |
| 5,541,583 A | 7/1996 | Mandelbaum |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Kleese |
| 5,590,196 A | 12/1996 | Moreau |
| 5,592,377 A | 1/1997 | Lipkin |
| 5,592,378 A | 1/1997 | Cameron |
| 5,599,528 A | 2/1997 | Igaki |
| 5,602,936 A | 2/1997 | Green et al. |
| 5,603,025 A | 2/1997 | Tabb |
| 5,615,109 A | 3/1997 | Eder |
| 5,617,474 A | 4/1997 | Ditzig et al. |
| 5,619,558 A | 4/1997 | Jheeta |
| 5,621,201 A | 4/1997 | Langhans |
| 5,621,812 A | 4/1997 | Deaton et al. |
| 5,649,114 A | 4/1997 | Deaton et al. |
| 5,642,485 A | 5/1997 | Deaton et al. |
| 5,638,457 A | 6/1997 | Deaton et al. |
| 5,640,577 A | 6/1997 | Scharmer |
| 5,642,419 A | 6/1997 | Rosen |
| 5,644,723 A | 7/1997 | Deaton et al. |
| 5,644,778 A | 7/1997 | Burks et al. |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,521 A | 10/1997 | Garrou |
| 5,677,955 A | 10/1997 | Doggett et al. |
| 5,679,938 A | 10/1997 | Templeton |
| 5,679,940 A | 10/1997 | Templeton |
| 5,680,459 A | 10/1997 | Hook et al. |
| 5,687,250 A | 11/1997 | Curley et al. |
| 5,687,322 A | 11/1997 | Deaton et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Powell |
| 5,732,400 A | 3/1998 | Mandler et al. |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson et al. |
| 5,784,696 A | 7/1998 | Melnikof |
| 5,787,403 A | 7/1998 | Randle |

(56) References Cited

U.S. PATENT DOCUMENTS

| | | |
|---|---|---|
| 5,789,732 A | 8/1998 | McMahon et al. |
| 5,794,221 A | 8/1998 | Egendorf |
| 5,796,827 A | 8/1998 | Coppersmith et al. |
| 5,793,861 A | 9/1998 | Haigh |
| 5,802,498 A | 9/1998 | Comesanas |
| 5,802,499 A | 9/1998 | Sampson et al. |
| 5,819,238 A | 10/1998 | Fernholz |
| 5,826,241 A | 10/1998 | Stein |
| 5,826,245 A | 10/1998 | Sandberg-Diment |
| 5,832,090 A | 11/1998 | Raspotnik |
| 5,832,447 A | 11/1998 | Rieker |
| 5,832,457 A | 11/1998 | O'Brien |
| 5,832,460 A | 11/1998 | Bednar |
| 5,832,463 A | 11/1998 | Houvener et al. |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,811 A | 12/1998 | Atkins |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Belinger et al. |
| 5,873,072 A | 2/1999 | Kight |
| 5,878,141 A | 3/1999 | Daly et al. |
| 5,883,377 A | 3/1999 | Chapin, Jr. |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |
| 5,903,881 A | 5/1999 | Schrader |
| 5,907,142 A | 5/1999 | Kelsey |
| 5,910,896 A | 6/1999 | Hahn-Calrson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,949,044 A | 9/1999 | Walker et al. |
| 5,950,174 A | 9/1999 | Brendzel |
| 5,956,700 A | 9/1999 | Landry |
| 5,960,411 A | 9/1999 | Hartman et al. |
| 5,963,659 A | 10/1999 | Cahill et al. |
| 5,963,925 A | 10/1999 | Kolling et al. |
| 5,966,698 A | 10/1999 | Pollin |
| 5,970,475 A | 10/1999 | Barnes et al. |
| 5,970,478 A | 10/1999 | Walker et al. |
| 5,978,780 A | 11/1999 | Watson |
| 5,987,434 A | 11/1999 | Libman |
| 5,987,435 A | 11/1999 | Weiss et al. |
| 5,987,436 A | 11/1999 | Halbrook |
| 5,987,439 A | 11/1999 | Gustin |
| 5,991,749 A | 11/1999 | Morrill, Jr. |
| 5,991,750 A | 11/1999 | Craig |
| 6,003,762 A | 11/1999 | Hayashida |
| 6,000,832 A | 12/1999 | Franklin et al. |
| 6,002,767 A | 12/1999 | Kramer |
| 6,006,205 A | 12/1999 | Loeb et al. |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,026,388 A | 2/2000 | Liddy et al. |
| 6,029,139 A | 2/2000 | Cunningham et al. |
| 6,029,153 A | 2/2000 | Bauchner et al. |
| 6,032,133 A | 2/2000 | Hilt et al. |
| 6,032,134 A | 2/2000 | Weissman |
| 6,032,136 A | 2/2000 | Brake, Jr. et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,036,099 A | 3/2000 | Leighton |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,092,057 A | 7/2000 | Zimmerman et al. |
| 6,098,053 A | 8/2000 | Slater |
| 6,098,070 A | 8/2000 | Maxwell |
| 6,101,479 A | 8/2000 | Shaw |
| 6,105,007 A | 8/2000 | Norris |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,599 A | 10/2000 | Walker et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,138,917 A | 10/2000 | Chapin, Jr. |
| 6,141,666 A | 10/2000 | Tobin |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,168,385 B1 | 1/2001 | Clamp |
| 6,173,272 B1 | 1/2001 | Thomas et al. |
| 6,181,837 B1 | 1/2001 | Cahill et al. |
| 6,185,542 B1 | 2/2001 | Moran et al. |
| 6,185,544 B1 | 2/2001 | Sakamoto et al. |
| 6,188,309 B1 | 2/2001 | Levine |
| 6,202,054 B1 | 3/2001 | Lawlor et al. |
| 6,205,433 B1 | 3/2001 | Boesch et al. |
| 6,213,391 B1 | 4/2001 | Lewis |
| 6,223,168 B1 | 4/2001 | McGurl et al. |
| 6,227,447 B1 | 5/2001 | Campisano |
| 6,233,565 B1 | 5/2001 | Lewis et al. |
| 6,233,566 B1 | 5/2001 | Leving |
| 6,236,972 B1 | 5/2001 | Shkedy |
| 6,240,444 B1 | 5/2001 | Fin et al. |
| 6,243,689 B1 | 6/2001 | Norton |
| 6,267,292 B1 | 7/2001 | Walker et al. |
| 6,278,981 B1 | 8/2001 | Dembo et al. |
| 6,282,552 B1 | 8/2001 | Thompson et al. |
| 6,289,322 B1 | 9/2001 | Kitchen et al. |
| 6,292,789 B1 | 9/2001 | Schutzer |

(56) References Cited

U.S. PATENT DOCUMENTS

| | | |
|---|---|---|
| 6,301,379 B1 | 10/2001 | Thompson et al. |
| 6,301,567 B1 | 10/2001 | Leong et al. |
| 6,304,858 B1 | 10/2001 | Mosler et al. |
| 6,305,603 B1 | 10/2001 | Grunbok, Jr. et al. |
| 6,308,887 B1 | 10/2001 | Korman et al. |
| 6,321,212 B1 | 11/2001 | Lange |
| 6,324,524 B1 | 11/2001 | Lent et al. |
| 6,327,575 B1 | 12/2001 | Katz |
| 6,338,047 B1 | 1/2002 | Wallman |
| 6,338,049 B1 | 1/2002 | Walker et al. |
| 6,341,724 B2 | 1/2002 | Campisano |
| 6,343,279 B1 | 1/2002 | Bissonette et al. |
| 6,347,307 B1 | 2/2002 | Sandhu et al. |
| 6,349,290 B1 | 2/2002 | Horowitz et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,405,181 B2 | 6/2002 | Lent et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,424,949 B1 | 7/2002 | Deaton et al. |
| 6,434,159 B1 | 8/2002 | Woodward et al. |
| 6,446,072 B1 | 9/2002 | Schulze et al. |
| 6,460,020 B1 | 10/2002 | Pool et al. |
| 6,485,922 B1 | 11/2002 | Erickson et al. |
| 6,490,568 B1 | 12/2002 | Omara et al. |
| 6,493,685 B1 | 12/2002 | Ensel et al. |
| 6,513,019 B2 | 1/2003 | Lewis |
| 6,535,896 B2 | 3/2003 | Britton et al. |
| 6,536,663 B1 | 3/2003 | Lozier et al. |
| 6,554,185 B1 | 4/2003 | Montross et al. |
| 6,560,581 B1 | 5/2003 | Fox et al. |
| 6,567,791 B2 | 5/2003 | Lent et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,607,127 B2 | 8/2003 | Wong |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,671,673 B1 | 12/2003 | Baseman et al. |
| 6,704,714 B1 | 3/2004 | O'Leary et al. |
| 6,721,715 B2 | 4/2004 | Nemzow |
| 6,728,397 B2 | 4/2004 | McNeal |
| D490,840 S | 6/2004 | Arakaki et al. |
| D491,186 S | 6/2004 | Arakaki et al. |
| D491,953 S | 6/2004 | Arakaki et al. |
| D496,365 S | 9/2004 | Liu et al. |
| D498,236 S | 11/2004 | Liu et al. |
| 6,820,058 B2 | 11/2004 | Wood et al. |
| 6,824,066 B2 | 11/2004 | Weyant |
| 6,825,940 B1 | 11/2004 | Wu et al. |
| 6,860,375 B2 | 3/2005 | Hallowell et al. |
| 6,865,547 B1 | 3/2005 | Brake, Jr. et al. |
| 6,954,896 B1 | 10/2005 | Dodrill et al. |
| 6,965,882 B1 | 11/2005 | Lapstun et al. |
| 6,970,259 B1 | 11/2005 | Lunt et al. |
| 6,970,830 B1 | 11/2005 | Samra et al. |
| 6,970,855 B2 | 11/2005 | Das et al. |
| RE38,957 E | 1/2006 | Laussermair et al. |
| 6,999,943 B1 | 2/2006 | Johnson et al. |
| 7,004,382 B2 | 2/2006 | Sandru |
| 7,025,256 B1 | 4/2006 | Drummond et al. |
| 7,062,456 B1 | 6/2006 | Riehl et al. |
| 7,068,832 B1 | 6/2006 | Price et al. |
| 7,070,095 B1 | 7/2006 | Gandel et al. |
| 7,104,443 B1 | 9/2006 | Paul et al. |
| 7,133,846 B1 | 11/2006 | Ginter et al. |
| 7,167,844 B1 * | 1/2007 | Leong et al. ............ 705/80 |
| 7,177,836 B1 | 2/2007 | German et al. |
| 7,194,437 B1 | 3/2007 | Britto et al. |
| 7,200,255 B2 | 4/2007 | Jones et al. |
| 7,228,155 B2 | 6/2007 | Saunders |
| 7,249,044 B2 | 7/2007 | Kumar et al. |
| 7,249,112 B2 | 7/2007 | Berardi et al. |
| 7,312,707 B1 | 12/2007 | Bishop et al. |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom |
| RE40,220 E | 4/2008 | Nichols et al. |
| 7,380,707 B1 | 6/2008 | Fredman |
| 7,401,048 B2 | 7/2008 | Rosedale et al. |
| 7,493,288 B2 | 2/2009 | Bishop et al. |
| 7,546,272 B2 | 6/2009 | Loy |
| 7,548,881 B2 | 6/2009 | Narayan et al. |
| 7,587,363 B2 | 9/2009 | Cataline et al. |
| 8,244,625 B2 * | 8/2012 | Holm ............ G06Q 20/04 705/26.1 |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0027441 A1 | 10/2001 | Wankmueller |
| 2001/0032139 A1 | 10/2001 | Debonnet, Jr. |
| 2001/0034663 A1 | 10/2001 | Teveler et al. |
| 2001/0037300 A1 | 11/2001 | Miyazaki et al. |
| 2001/0037309 A1 | 11/2001 | Carlyle |
| 2001/0038033 A1 | 11/2001 | Habib |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2001/0051919 A1 | 12/2001 | Mason |
| 2002/0012445 A1 | 1/2002 | Perry |
| 2002/0013728 A1 | 1/2002 | Wilkman |
| 2002/0023055 A1 | 2/2002 | Atognini et al. |
| 2002/0026394 A1 | 2/2002 | Savage et al. |
| 2002/0032651 A1 | 3/2002 | Embrey |
| 2002/0038363 A1 | 3/2002 | MacLean |
| 2002/0046169 A1 | 4/2002 | Keresman, III et al. |
| 2002/0047316 A1 | 4/2002 | Chitayat |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082985 A1 | 6/2002 | MacKay |
| 2002/0084321 A1 | 7/2002 | Martens et al. |
| 2002/0087415 A1 | 7/2002 | Allen et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0095373 A1 | 7/2002 | Melchior et al. |
| 2002/0099655 A1 | 7/2002 | Melchior et al. |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0110070 A1 | 8/2002 | Sako et al. |
| 2002/0111837 A1 | 8/2002 | Aupperle |
| 2002/0128981 A1 | 9/2002 | Kawan et al. |
| 2002/0138390 A1 | 9/2002 | May |
| 2002/0138398 A1 | 9/2002 | Kalin et al. |
| 2002/0143621 A1 | 10/2002 | Donnelly et al. |
| 2002/0156723 A1 | 10/2002 | Lilly et al. |
| 2002/0169658 A1 | 11/2002 | Adler |
| 2002/0170966 A1 | 11/2002 | Hannigan et al. |
| 2002/0178071 A1 | 11/2002 | Walker et al. |
| 2002/0178109 A1 | 11/2002 | Bye |
| 2002/0184123 A1 | 12/2002 | Sijacic et al. |
| 2002/0184151 A1 | 12/2002 | Maloney |
| 2002/0194081 A1 | 12/2002 | Perkowski |
| 2002/0194096 A1 | 12/2002 | Falcone et al. |
| 2002/0198817 A1 | 12/2002 | Dhir |
| 2002/0199182 A1 | 12/2002 | Whitehead |

(56) References Cited

U.S. PATENT DOCUMENTS

| | | |
|---|---|---|
| 2003/0018557 A1 | 1/2003 | Gilbert et al. |
| 2003/0018563 A1 | 1/2003 | Kilgour et al. |
| 2003/0018567 A1 | 1/2003 | Flitcroft et al. |
| 2003/0023526 A1 | 1/2003 | Stewart |
| 2003/0028481 A1 | 2/2003 | Flitcroft et al. |
| 2003/0037002 A1 | 2/2003 | Higgins et al. |
| 2003/0040959 A1 | 2/2003 | Calvin et al. |
| 2003/0046218 A1 | 3/2003 | Albanese et al. |
| 2003/0055675 A1 | 3/2003 | Klein Twennaar |
| 2003/0069780 A1 | 4/2003 | Hailwood et al. |
| 2003/0097335 A1 | 5/2003 | Muskowitz et al. |
| 2003/0100803 A1 | 5/2003 | Lu et al. |
| 2003/0105641 A1 | 6/2003 | Lewis |
| 2003/0110136 A1 | 6/2003 | Wells et al. |
| 2003/0110442 A1 | 6/2003 | Battle |
| 2003/0120686 A1 | 6/2003 | Kim et al. |
| 2003/0130945 A1 | 7/2003 | Force et al. |
| 2003/0130952 A1 | 7/2003 | Bell et al. |
| 2003/0140005 A1 | 7/2003 | Cole |
| 2003/0144942 A1 | 7/2003 | Sobek |
| 2003/0187787 A1 | 10/2003 | Freund |
| 2003/0187789 A1 | 10/2003 | Karas et al. |
| 2003/0191710 A1 | 10/2003 | Green et al. |
| 2003/0200107 A1 | 10/2003 | Allen et al. |
| 2003/0208421 A1 | 11/2003 | Vicknair et al. |
| 2003/0208441 A1 | 11/2003 | Poplawski et al. |
| 2003/0218066 A1 | 11/2003 | Fernandes et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0010465 A1 | 1/2004 | Michalski et al. |
| 2004/0019605 A1 | 1/2004 | Keown et al. |
| 2004/0029569 A1 | 2/2004 | Khan et al. |
| 2004/0034595 A1 | 2/2004 | Kugeman et al. |
| 2004/0049449 A1 | 3/2004 | Martinelli |
| 2004/0049451 A1 | 3/2004 | Berardi |
| 2004/0049456 A1 | 3/2004 | Dreyer |
| 2004/0064409 A1 | 4/2004 | Kight et al. |
| 2004/0073510 A1* | 4/2004 | Logan .............. 705/40 |
| 2004/0078328 A1 | 4/2004 | Talbert et al. |
| 2004/0088245 A1* | 5/2004 | Narayan .............. G06Q 10/063 705/38 |
| 2004/0094624 A1 | 5/2004 | Fernandes et al. |
| 2004/0107153 A1 | 6/2004 | Lundberg |
| 2004/0111302 A1 | 6/2004 | Falk et al. |
| 2004/0117307 A1 | 6/2004 | Carlis et al. |
| 2004/0133516 A1 | 7/2004 | Buchanan et al. |
| 2004/0149544 A1 | 8/2004 | Dal Ferro |
| 2004/0159700 A1 | 8/2004 | Khan et al. |
| 2004/0172360 A1 | 9/2004 | Mabrey et al. |
| 2004/0201735 A1 | 10/2004 | Baron |
| 2004/0210498 A1 | 10/2004 | Freund |
| 2004/0228514 A1 | 11/2004 | Houle et al. |
| 2004/0232223 A1 | 11/2004 | Beenau et al. |
| 2004/0236660 A1 | 11/2004 | Thomas et al. |
| 2004/0236688 A1 | 11/2004 | Bozeman |
| 2004/0239481 A1 | 12/2004 | Beenau |
| 2004/0243503 A1 | 12/2004 | Eng et al. |
| 2004/0252012 A1 | 12/2004 | Beenau et al. |
| 2004/0254837 A1 | 12/2004 | Roshkoff |
| 2004/0260607 A1 | 12/2004 | Robbins et al. |
| 2005/0021466 A1 | 1/2005 | Buchanan et al. |
| 2005/0033619 A1 | 2/2005 | Barnes et al. |
| 2005/0033690 A1 | 2/2005 | Antognini et al. |
| 2005/0035847 A1 | 2/2005 | Bonalle et al. |
| 2005/0040242 A1 | 2/2005 | Beenau et al. |
| 2005/0055254 A1 | 3/2005 | Schmidtberg et al. |
| 2005/0077349 A1 | 4/2005 | Bonalle et al. |
| 2005/0086178 A1 | 4/2005 | Xie et al. |
| 2005/0091156 A1 | 4/2005 | Hailwood et al. |
| 2005/0097046 A1 | 5/2005 | Singfield |
| 2005/0097050 A1 | 5/2005 | Orcutt |
| 2005/0108153 A1 | 5/2005 | Thomas et al. |
| 2005/0116024 A1 | 6/2005 | Beenau et al. |
| 2005/0144059 A1 | 6/2005 | Schuessler |
| 2005/0144130 A1 | 6/2005 | Staniar et al. |
| 2005/0171898 A1 | 8/2005 | Bishop |
| 2005/0177448 A1 | 8/2005 | Fu et al. |
| 2005/0177480 A1 | 8/2005 | Huang |
| 2005/0209954 A1 | 9/2005 | Asher et al. |
| 2005/0228751 A1 | 10/2005 | Keown et al. |
| 2005/0261955 A1 | 11/2005 | Humble et al. |
| 2005/0283437 A1* | 12/2005 | McRae .............. G06Q 20/102 705/40 |
| 2006/0036553 A1 | 2/2006 | Gupta et al. |
| 2006/0041540 A1 | 2/2006 | Shannon et al. |
| 2006/0089890 A1 | 4/2006 | Campbell |
| 2006/0095374 A1* | 5/2006 | Lo .............. G06Q 20/108 705/42 |
| 2006/0106650 A1 | 5/2006 | Bush |
| 2006/0106717 A1 | 5/2006 | Randle et al. |
| 2006/0136335 A1 | 6/2006 | Ferguson, III |
| 2006/0149653 A1* | 7/2006 | Davis .............. G06Q 30/00 705/37 |
| 2006/0149668 A1 | 7/2006 | Zafrir |
| 2006/0161501 A1 | 7/2006 | Waserstein et al. |
| 2006/0167989 A1 | 7/2006 | Bashen et al. |
| 2006/0178986 A1 | 8/2006 | Giordano et al. |
| 2006/0206427 A1 | 9/2006 | Love et al. |
| 2006/0259390 A1 | 11/2006 | Rosenberger |
| 2006/0282389 A1 | 12/2006 | Gupte |
| 2006/0287953 A1 | 12/2006 | Chauhan |
| 2007/0005498 A1 | 1/2007 | Cataline et al. |
| 2007/0138255 A1 | 6/2007 | Carreon et al. |
| 2007/0265924 A1 | 11/2007 | Shcwarz |
| 2007/0288334 A1 | 12/2007 | Creedle et al. |
| 2008/0010202 A1 | 1/2008 | Schwarz |
| 2008/0116283 A1 | 5/2008 | Newbrough et al. |
| 2008/0193008 A1 | 8/2008 | Mount et al. |
| 2009/0043651 A1 | 2/2009 | Schwarz |
| 2011/0251965 A1* | 10/2011 | Holm .............. G06Q 20/04 705/80 |

FOREIGN PATENT DOCUMENTS

| | | |
|---|---|---|
| EP | 1014318 | 6/2000 |
| JP | 2001-266039 | 9/2001 |
| JP | 2002-024618 | 1/2002 |
| JP | 2002-056063 | 2/2002 |
| JP | 2002-083241 | 3/2002 |
| JP | 2002-087536 | 3/2002 |
| JP | 2002-508547 | 3/2002 |
| JP | 2002-140505 | 5/2002 |
| JP | 2007-088822 | 4/2007 |
| WO | 91/16691 | 10/1991 |
| WO | 93/08545 | 4/1993 |
| WO | 94/28497 | 12/1994 |
| WO | 96/08783 | 3/1996 |
| WO | 96/12242 | 4/1996 |
| WO | 97/14108 | 4/1997 |
| WO | 97/45796 | 12/1997 |
| WO | 97/45814 | 12/1997 |
| WO | 98/09260 | 3/1998 |
| WO | 99/10823 | 3/1999 |
| WO | 99/49404 | 9/1999 |
| WO | 00/18060 | 3/2000 |
| WO | 00/39979 | 7/2000 |
| WO | 01/75730 | 10/2001 |
| WO | 02/063432 | 8/2002 |
| WO | 04/079603 | 9/2004 |

OTHER PUBLICATIONS

Andersen Consulting, Image-Based Transaction Processing: The Banking Industry's Challenge for the 1990s and Beyond (1989).

Andrew Gluck, Creating a global cash-management game plan, Bank Systems & Tech., Feb. 1997, at 28.

Andrew Reinbach, Chase steps up treasury system, Bank Systems & Tech., Nov. 1995, at 29.

Angela Maher & Jeffrey Troutman, PNC Bank Treasury Management, Payor's Prescription for Painless Migration to Receipt of

(56) References Cited

OTHER PUBLICATIONS

Electronic Healthcare Payments and Remittance Advices (Dec. 2001).
Angela Maher & Jeffrey Troutman, PNC Bank Treasury Management, Provider's Prescription for Painless Migration to Receipt of Electronic Healthcare Payments and Remittance Advices (Dec. 2001).
Ann Keeton, Bank of America Completes Its Rollout of 'Paperless' Processing of Payments, Wall St. J., Nov. 1, 1999, at B13.
BancTec Selects Alchemy CD-Based Archival Solution for Remittance Processing System, Bus. Wire, May 6, 1998.
Bank of America Provides Nationwide Lockbox Services, Press Release, Oct. 20, 1999.
Bridget Malone, Internet Billing: Building a Secure Global Market, Electronic Commerce World, Jan. 2001, at 46.
Caere introduces the Model 1800 document remittance processor, Bus. Wire, Oct. 19, 1995.
CardFlash, Daily Payment Card News, Sep. 23, 2004.
CES/NaBanco introduces stored value card technology; Blockbuster Video is first merchant partner, Bus. Wire, Jan. 15, 1996.
Chapter Reports: Texas Chapter, Work Process Improvement Today, Apr. 1998.
Chase Image-Enables NY Wholesale Lockbox Facility with VICOR Technology, Press Release, Aug. 31, 1999.
Chase Manhattan introduces new FEDI payables product, Cash Mgmt. News, May 1995.
Chase offers image lockbox for Europe, Bank Systems & Tech., Aug. 1997, at 37.
Chasing the Global Trend, Cash Mgmt. News, Dec. 1995, at 8.
Christy Tauhert, Lock Box Solutions Reengineer Payment, Insurance & Tech., Aug. 1996, at 22.
Cindy Jensen, U.S. Bank Effectively Manages Complexity, Today, May/Jun. 2006.
Council for Electronic Billing and Payment, Business-to-Business EIPP: Presentment Models and Payment Options Part One (Jan. 2001).
Council for Electronic Billing and Payment, Business-to-Business EIPP: Presentment Models and Payment Options Part Two (Jan. 2001).
Crestar to Introduce New Advanced Cash Management System Based on IA Corp. Software, Bus. Wire, Oct. 28, 1996.
Dieter Wackerow, MQSeries Enterprise Application Integration Center, MQ Series Primer, Oct. 1999.
DMP and IMR Partner to Develop Electronic Archiving Solution for Wholesale Lockboxes and Remittance Processing, Bus. Wire, Mar. 24, 1998.
Douglas Armstrong, Norwest eases difficulty of interstate banking Bank's customers may use the same account number at any branch, Milwaukee J. Sentinel, Oct. 12, 1995, at 2.
Du Pont's Electronic Payments System, Corporate EFT Report, Jan. 11, 1989.
Elena Malykhina, Cell Phone Software Formats Check for Online Banking, InformationWeek, Jan. 24, 2008.
Erica Goode, on Profit, Loss and the Mysteries of the Mind, N.Y. Times, Nov. 5, 2002.
Fidelity Helps Fund Sellers Trim the Taxes They'll Owe, Wall St. J., Nov. 7, 2002.
First Data markets stored-value cards, Cards Int'l, Jan. 30, 1996, at 5.
Frank J. Derfler, Jr. & Les Freed, How Networks Work 144-51 (2003).
Get ready for electronic commerce, ABA Banking J., Jun. 1995, at 47.
Gordon Platt, Online billing & payments: Technology Providers Multiply, Global Fin., Apr. 1, 2001.
Gregory Zuckerman, The Hedge-Fund Craze, Wall St. J., Jun. 12, 2002.
Henry Urrows & Elizabeth Urrows, Automated imaging in financial services, 11 Document Image Automation 259 (Sep.-Oct. 1991).

IA announced installation at QuestPoint of first client/server cash management system with check image storage compatible with IBM, NCR and Unisys, Bus. Wire, May 29, 1997.
IA Corp. Announces New CheckVision Products, Bus. Wire, Apr. 1, 1996.
IA Corp. shows complex transaction processing software WorkVision at AIIM, Bus. Wire, Apr. 14, 1997.
IA Corp. Wins Contract With Comercia to Install the First Digital All Items Archive, Bus. Wire, Jan. 9, 1997.
IA Corporation Becomes a Major Player in Image-Based Cash Management Solutions, Bus. Wire, Nov. 24, 1995.
IA Presents New Advanced Cash Management Software at TMA to Link Banks and Their Corporate Customers, Bus. Wire, Nov. 18, 1996.
Ian McDonald, The Stars in the Sky Flicker, and Fund Stars Do the Same, Wall St. J., Jan. 15, 2003.
IA's RemitVision adapted by Harris Bank for CD-ROM and Online Customer Viewing of Check and Remittance Documents, Bus. Wire, May 28, 1996.
In Brief: Wachovia-InteliData Deal, Am. Banker, May 7, 2002.
Initial Launch to 200 Credit Unions, USA Today, Jun. 27, 2002.
Intelidata Technologies Corporation, Form 10-K for fiscal year ended Dec. 31, 2001.
J.D. Carreker, Electronic Check Presentment: Capturing new technology, Banking Mgmt., Mar./Apr. 1995, at 32.
J.P. Buckley et al., Processing noisy structured textual data using a fuzzy matching approach: application to postal address errors, 4 Soft Computing 195 (2000).
Jeetu Patel & Joe Fenner, E-Billing Moves Into B2B, Imaging & Document Solutions, Jan. 2001, at p. 44.
Jeetu Patel, B-to-B E-Billing Heats Up—Business-to-business electronic billing is more complex than the business-to-consumer model, but the potential payoffs are bigger, InformationWeek, Oct. 23, 2000.
John C. Bogle, Founder and Former Chairman, The Vanguard Group, Remarks to the '40 Act Institute of Practising Law Institute: Mutual Funds at the Millennium—Fund Directors and Fund Myths (May 15, 2000).
John Shannon, New lockbox platform due out at NationsBank, Bank Systems & Tech., Feb. 1998, at 38.
Jonathan Clements, Harsh Truth: Your Investments Likely Won't Make Any Money, Wall St. J., Nov. 27, 2002.
Keith Lamond, Credit Card Transactions Real World and Online, available at, http://www.virtualschool.edu/mon/ElectronicProperty/klamond/credit_card.htm (last visited Jul. 8, 2005).
Kristen French, Investors Worry CheckFree Being Chased from its Own Game, TheStreet.com, Jun. 20, 2001.
Liz Moyer, Bank of Montreal to Install Imaging System by Unisys for Retail Lockbox Services, Am. Banker, Oct. 22, 1996, at 19.
Liz Moyer, KeyCorp Joins Trend to Check Imaging Lockbox, Am. Banker, Aug. 23, 1996.
M. Williams, FRIIS, Goodbye to paper?, ABA Banking J., Mar. 1989, at 61.
Mark Arend, Bank applications fuel optical storage market, ABA Banking J., Oct. 1991, at 77.
Melinda Norris, First Data Unit Develops Blockbuster Cash Card, Omaha World Herald, Jan. 19, 1996, at 16.
NationsBank rolls out first wholesale lockbox imaging, Potomac, Aug. 3, 1995, at 1.
NCR introduces 7780 item processing system, Bus. Wire, Mar. 11, 1992.
Newsbyte, Visa & Carnegie Mellon Plan Online Payment Scheme, 1995 WL 2205732, Feb. 15, 1995.
Nokia Announces the World's First NFC Enabled Mobile Product for Contactless Payment and Ticketing, PR Newswire, Feb. 9, 2005.
Offer: Book Yourself Free Cassettes, Birmingham Post, Mar. 25, 2000, at 16.
Operating in a multi-currency environment, Aslamoney, Oct. 1995, at 6.
Patricia A. Murphy, E-Billing: New Age Electronic Data; Interchange or Something Better?, Bank Tech. News, Jul. 2000, at 43.
Paul Williams, IBM UK Laboratories Ltd., IBM MQSeries Commercial Messaging, ACM SIGICE Bulletin, Apr. 1995.

(56) References Cited

OTHER PUBLICATIONS

Payment Data Systems files patent on debit card payment solution, Am. City Business J., Mar. 5, 2004.
PNC Bank Add Chicago to National Lockbox Network, PR Newswire, Nov. 5, 1997.
Priya Malhotra, Clearing House Enumerates e-Payment Ills, Am Banker, Aug. 13, 2002.
Richard J. Maturi, Personal Finance; When you need to send cash in a flash, N.Y. Times, Sep. 25, 1988, at A7.
Robert M. Hunt, Federal Reserve Bank of Philadelphia, Working Paper No. 03-10: An Introduction to the Economics of Payment Card Networks (Jun. 2003).
Robert M. Hunt, An Introduction to the Economics of Payment Card Networks, Rev. Network Econ., Jun. 2003, at 80.
Scott Leibs, Internet Billing Gets Its Due, CFO, Feb. 1, 2001, at 30.
Shawmut Bank Provides Lockbox Customers Real-Time, On-Line Electronic Exception Processing, Bus. Wire, Jan. 9, 1996.
Sherree DeCovney, Net scope, Banking Tech., May 1997, at 28.
Simultaneous Image Capture, Bank News, Oct. 1996, at 10.
State of Minnesota using AT&T imaging solution to reengineer sales tax paying process, Bus. Wire, Apr. 18, 1994.
Stephen M. Matyas, Digital Signatures—An Overview, 3 Computer Networks 87 (1979).
Steve Bills, Chase Pact Done, What's Next for Web Vendors?, Am. Banker, Jun. 3, 2002, at 23.
Steve Forbes, Fact and Comment, Forbes, Sep. 30, 2002, at 33.
Steven Marjanovic, Corporate Services: Chase Gears Up Global Payments System Series: 16, Am. Banker, Sep. 11, 1995, at 41.
Steven Marjanovic, NationsBank offers lockbox imaging, Am. Banker, Jul. 3, 1995, at 20.
Systems spell change for foreign exchange, Global Investor, Nov. 1996, at 18.
Terrie Miller & Henry Yan, When custody governs, Benefits Canada, Feb. 1998, at 33.
The payments system gets a new image, ABA Banking J., Mar. 1990, at 84.
Thomas P. Fitch, Image Technology brings lockbox breakthroughs, Corp. Cashflow Magazine, Sep. 1995, at 16.
U.S. Appl. No. 60/133,577, filed May 11, 1999.
Valerie Block, Blockbuster Running Test of a Stored Value Card, Am. Banker, Sep. 1, 1995.
Wausau Financial Systems' ImageRPS and OPEX interface a perfect math, Work Process Improvement Today, Dec. 1997.
Wells Fargo Rolls out Nationwide Lockbox Check Conversion, PR Newswire, Apr. 22, 2003.
Wendy S. Mead, Two Banks' Imaging Deals Target Fee Revenue Increases, Am. Banker, May 9, 1997, at 11.
Wholesale lockbox imaging, ABA Banking J., Feb. 1, 1993.

* cited by examiner

| Edit Discount Program - Gold Suppliers Group | |
|---|---|
| Define the discount program. | * indicates required field |

Pay Me Now

Pay Me Now automates approval of early payment requests from suppliers in exchange for a discount.

| | |
|---|---|
| Active: | ☑ |
| * Annual Hurdle Rate: | 7.75 % ── 502 |
| * Calendar Days: | 365 The daily discount equates to 0.021 % ── 504 |
| Discount Pay Cycle: | Payments can be scheduled every ☑Mon ☑Tue ☑Wed ☑Thu ☑Fri ☐Sat ☐Sun ── 503 |
| Invoice Terms: | ☐ Only apply Pay Me Now to Net terms |

( OK )  ( Cancel )

Invoices Eligible for Early Payment

| Invoice # | PO # | Buyer | Amount | Sched. Pay Date | Early Payment Amount | Early Payment Date | |
|---|---|---|---|---|---|---|---|
| 789817984 | 0000000311 | Acme Inc. | $20,000.00 | Jun 30, 2003 | $19,815.89 | Jun 16, 2003 | Pay Me Now |
| 245445483 | | Acme Inc. | $15,295.00 | Jul 5, 2003 | $15,204.54 | Jun 16, 2003 | Pay Me Now |
| 874328758 | 0000000314 | Acme Inc. | $300,000.00 | Jul 5, 2003 | $298,817.14 | Jun 16, 2003 | Pay Me Now |
| 432432234 | 0000000300 | Cartwright Inc. | $87,544.00 | Jul 6, 2003 | $87,198.83 | Jun 16, 2003 | Pay Me Now |
| 543234313 | 0000000338 | Cartwright Inc. | $109,655.00 | Jul 7, 2003 | $109,222.65 | Jun 16, 2003 | Pay Me Now |
| 945961255 | 0000000339 | Cartwright Inc. | $29,455.00 | Jul 7, 2003 | $29,338.86 | Jun 16, 2003 | Pay Me Now |

Showing 1-6 of 34

Add Filters

Early Payment Offer

Invoice # or Buyer [   ] Go
Advanced Search

Early Payment Status
▲ Pay Me Now
▲ Pending Pay Me Now
▲ Outstanding Early Payment Offers Early Payment Offer

FIG. 6

Early Payment Offer

Invoice # or Buyer
[  ] Go
Advanced Search

Early Payment Status
▲ Pay Me Now
▲ Pending Pay Me Now
▲ Outstanding Early
   Payment Offers

Early Payment Options

Invoice #        789817984
PO #             0000000311
Buyer            Acme Inc.
Current Payment  $20,000.00 on Jun 30, 2003 — 702

| Early Payment | Analysis | Discount Rate | |
|---|---|---|---|
| $19,815.89 on Jun 16, 2003 | $184.11 discount for 14 days early payment | 0.92% | Select |
| $19,842.19 on Jun 18, 2003 | $157.81 discount for 12 days early payment | 0.79% | Select |
| $19,868.49 on Jun 20, 2003 | $131.51 discount for 10 days early payment | 0.66% | Select |
| $19,907.95 on Jun 23, 2003 | $92.05 discount for 7 days early payment | 0.46% | Select |
| $19,947.40 on Jun 26, 2003 | $52.60 discount for 4 days early payment | 0.26% | Select |

⎫ 703

Early Payment Offer

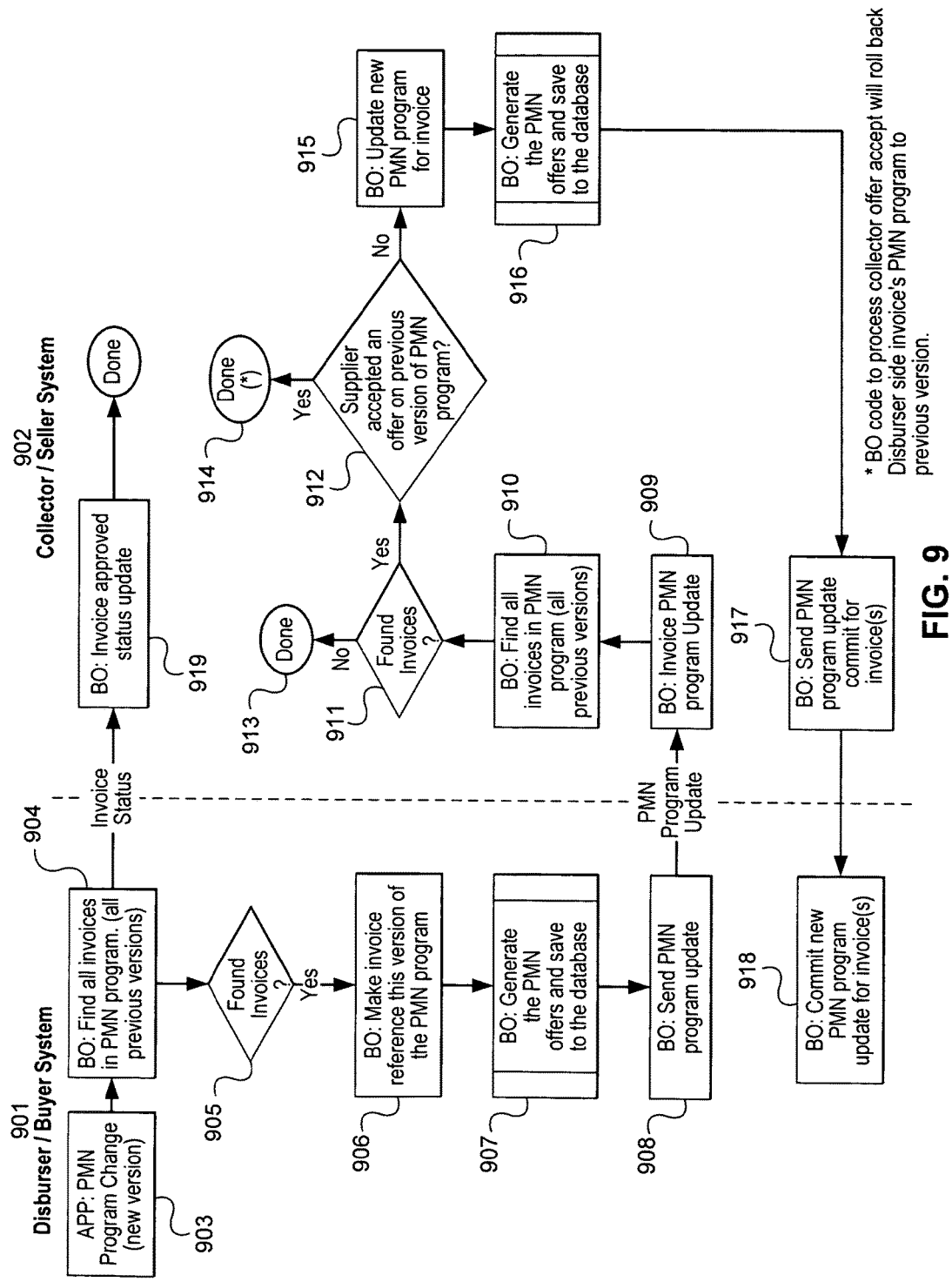

Early Payment Offer

Invoice # or Buyer
[____] Go
Advanced Search

Early Payment Status
▸ Pay Me Now
▸ Pending Pay Me Now
▸ Outstanding Early Payment Offers

Early Payment Offer for Multiple Invoices

If you need to collect a specific dollar amount before the end of a specified period, you can make an early payment discount offer to the Buyer of your choice to meet this goal. Fill in the appropriate information below to determine if your goals can be met from the Buyer's outstanding invoices.

1. Choose the Buyer
   [Acme, Inc. ▾] — 1002

2. Enter the date upon which you would like to receive payment
   [06/30/2003] — 1003

3. Enter the total amount you would like to collect
   [$1,000,000.00] — 1004

3. Enter the desired annual cost of capitol ⓘ
   (this will determine the discount offered to the Buyer)
   [8.25] % — 1005

[Submit] [Cancel]

Early Payment Offer

Early Payment Offer Summary

Buyer: Acme Inc.
Pay By Date: 06/30/2003
Amount Requested: $1,000,000.00
Invoices Total: $ 999,342.00 —— 1102
Estimated Collection: $ 996,210.54
Total Discount: $ 3,131.46 —— 1103
Annual Cost of Capitol: 8.25%

| Invoice # | Current Payment | Early Payment | Analysis | Discount Rate |
|---|---|---|---|---|
| ☑ 101081091 | $165,149 on Jul 16, 2003 | $164,551.75 on Jun 30, 2003 | $ 597.25 discount for 16 days early payment | 0.36% |
| ☑ 189498141 | $ 65,474 on Jul 15, 2003 | $ 65,252.02 on Jun 30, 2003 | $ 221.98 discount for 15 days early payment | 0.34% |
| ☑ 148914044 | $354,101 on Jul 14, 2003 | $352,980.49 on Jun 30, 2003 | $1,120.51 discount for 14 days early payment | 0.32% |
| ☑ 101081092 | $297,025 on Jul 13, 2003 | $296,152.23 on Jun 30, 2003 | $ 872.77 discount for 13 days early payment | 0.29% |
| ☑ 108095805 | $117,593 on Jul 12, 2003 | $117,274.05 on Jun 30, 2003 | $ 318.95 discount for 12 days early payment | 0.27% |
| TOTAL | $999,342.00 | $996,210.54 on Jun 30, 2003 | $3,131.46 discount for an average of 14 days early payment | 0.32% |

1104 (Early Payment)  1105 (Analysis)

Confirm  Cancel

FIG. 11

Edit Discount Program - Gold Suppliers Group

Define the discount program.

\* indicates required field

Supplier Discount Terms

Supplier discount terms allow approved suppliers to select from a list of buyer approved discount terms while creating an invoice via Collector.

Active: ☑ ~1202

Discount Terms:

Available Discount Terms ~1203
- 0.5% 10 / Net 30
- 0.5% 10 / Net 45
- 1% 10 / Net 45
- 1.5% 10 / Net 30
- 1.5% 10 / Net 45

( Add >> )
( << Remove )

Selected Discount Terms ~1204
- 1% 10 / Net 30
- 1.5% 10 / Net 45
- 2% 10 / Net 60

1201

( OK )  ( Cancel )

FIG. 12

Payment Terms

Your Progress (!) PAY ME ASAP terms encourages your customer to pay you sooner than with traditional terms by prorating the discount rate you choose down to zero between the discount due date and the net due date.

Click here to learn more.

Through the Payment Services Network, your customers can approve invoices rapidly and pay you early. Please select an early payment term that you would be willing to accept:

Payment Terms

- ○ 5 days, 3.0% discount, Net 30    PAY ME ASAP
- ○ 10 days, 2.0% discount, Net 30   PAY ME ASAP
- ○ 15 days, 1.5% discount, Net 30   PAY ME ASAP
- ○ 20 days, 1.0% discount, Net 30   PAY ME ASAP
- ○ 25 days, 0.5% discount, Net 30   PAY ME ASAP
- ● Net 45

If you have a pre-existing contractual term with your customer that is not listed above, please choose any term from the list and then fax your current contract to your customer so they may honor it and make the necessary changes. A fax number for your customer will be provided on the next page.

METHODS AND SYSTEMS FOR DISCOUNTS MANAGEMENT

REFERENCE TO RELATED APPLICATIONS

This application is a divisional of U.S. patent application Ser. No. 11/002,234, filed Dec. 1, 2004, which claims the benefit of U.S. Provisional Patent Application No. 60/581,022, filed Jun. 17, 2004, the disclosures of which are incorporated herein by reference in their entirety.

This application is related to the following United States patent applications:

System and Method for Varying Electronic Settlements Between Buyers and Suppliers With Dynamic Discount Terms, U.S. application Ser. No. 10/155,806, filed May 24, 2002 (now abandoned), publication number US 2003-0220863, publication date Nov. 27, 2003, invented by Don Holm, Duc Lam, and Xuan McRae;

System and Method for Varying Electronic Settlements Between Buyers and Suppliers With Dynamic Discount Terms, PCT application number PCT/US03/15542, filed May 14, 2003, publication number WO 2003/100689, publication date Dec. 4, 2003, invented by Don Holm, Duc Lam, and Xuan McRae;

Method and System for Collaborative Vendor Reconciliation, U.S. application Ser. No. 10/155,797, filed May 24, 2002 (now abandoned), publication number US2003-0220858, publication date Nov. 27, 2003, invented by Duc Lam, Georg Muller, Chandra (CP) Agrawal, Baby Lingampalli, Pavel Lopin and Xuan (Sunny) McRae;

System and Method for Electronic Authorization of Batch Checks, U.S. application Ser. No. 10/155,800, filed May 24, 2002, U.S. Pat. No. 7,519,560, publication number US 2003-0220886, publication date Nov. 27, 2003, invented by Duc Lam, Matthew Roland and Xuan (Sunny) McRae;

System and Method for Electronic Payer (Buyer) Defined Invoice Exchange, U.S. application Ser. No. 10/155,840, filed May 24, 2002, U.S. Pat. No. 7,689,482, publication number US 2003-0220855, publication date Nov. 27, 2003, invented by Duc Lam, Method and System for Invoice Routing and Approval in Electronic Payment System, U.S. application Ser. No. 10/155,853, filed May 24, 2002 (now abandoned), publication number US2003-0220875, publication date Nov. 27, 2003, invented by Bob Moore and Xuan (Sunny) McRae; and Method and System for Buyer-Centric Dispute Resolution in Electronic Payment System, U.S. application Ser. No. 10/155,866, filed May 24, 2002, U.S. Pat. No. 7,437,327, publication number US2003-0220843, publication date Nov. 27, 2003, invented by Duc Lam, Celeste Wymand and Xuan (Sunny) McRae.

All of the foregoing applications are incorporated herein by reference in their entirety.

FIELD OF THE INVENTION

This invention relates to the field of software and computer network systems. In particular, the invention relates to electronic systems associated with financial transactions.

DESCRIPTION OF THE RELATED ART

In traditional paper payment systems, an organization or an individual initiates payment by sending a physical check to the party to whom a debt is owed. The check may be sent in response to an invoice from the party to whom the debt is owed. A newer approach is electronic payment. For example, in the consumer context, individuals may be able to make payment by way of electronic banking. Payment instructions are sent electronically from the individual's computer system to the individual's bank. Payment is then effected by the bank.

Numerous systems now exist relating to accounting and bill payment. For example, computer software is used to track invoices and print payment checks. Payments may be made by wire transfer, with instructions requesting funds of the payer in one financial institution to be transferred to an account of the party to whom payment is to be effected.

Enterprise resource planning (ERP) systems are used for managing the purchases of goods and services. Such systems may have databases of complex and extensive sets of information, such as addresses of various suppliers and similar information related to purchasing. Sellers also use electronic accounting and record keeping systems which may assist in the receipt and tracking receipt of payment for goods and services. Prior systems require considerable amounts of effort to update and maintain, and may lack compatibility with the systems used by parties with whom an organization wishes to engage in transactions. There is thus a need for improved systems to facilitate transactions between buyers and sellers.

SUMMARY

An embodiment of the invention is directed to a computer implemented business method in an electronic system in which payment information is exchanged between a buyer and a seller. Approval is received from the buyer of an electronic invoice received by the buyer. At a time when no agreed upon discount is available based on the invoice or pre-agreed terms between the buyer and the seller, a request is received from the buyer to offer the seller early payment in exchange for a discount of the amount owed. The discount is based on an annual hurdle rate provided to the system by the buyer. The early payment is to be made on days from among a set of one or more days of the week configured in the system by the buyer. The offer is presented to the seller on the seller's user interface, and a clickable button is provided for the seller to indicate selection of such offer. The clickable button may include an indication thereon that payment to the seller is to be made immediately. Such indication may include a phrase such as "pay me now." The electronic system may include a set of computers communicating over a network. The system may include an enterprise resource planning (ERP) system and early payment may be effected by the ERP system.

According to an embodiment of the invention, initially only information regarding a first available payment date is presented to the seller, and information regarding other possible payment dates for such transaction is not initially shown to the seller. According to another embodiment of the invention, the invoice may be approved by the buyer after expiration of a discount term.

A user interface window may be provided for the buyer. The user interface window may include an entry cell for the annual hurdle rate, a calculated daily discount rate that is based on the annual hurdle rate, and a list of days of the week in which individual days can be selected by the buyer as days for payment for the offer to the seller. In another embodiment, the seller's acceptance of the offer for early payment is received through the clickable button, and in response to such acceptance, electronic payment is effected from the buyer to the seller.

Another embodiment of the invention may include presenting a list of invoices to the seller on the user interface. The list of invoices are ones for which the buyer and any other buyers have offered the seller early payment in exchange for a discount of the amount owed at a time when no agreed upon discount is available based on the invoice or pre-agreed terms between the buyer and the seller. Clickable buttons are provided to the seller on the seller user interface. Each button is associated with an indication of a respective invoice. The buttons allow the seller to select the corresponding offer.

According to an embodiment of the invention, the manual payment request is made to an ERP system for the adjusted discount amount. Upon success of the request, a credit memo is issued for the discount amount and the credit memo is posted to the ERP system.

Another embodiment of the invention is directed to a computer implemented business system. The computer implemented business system includes computer program instructions for exchanging payment information between at least a buyer and at least a seller. The business system also includes a user interface screen for the buyer for configuring an offer to the seller of early payment in exchange for a discount of the amount owed. The user interface screen includes a field to receive an annual hurdle rate from the buyer, and a field to receive selection from the buyer of a set of one or more days of the week. The system also includes computer program instructions for presenting the offer to the seller on the seller's user interface at a time when no agreed upon discount is available based on the invoice or pre-agreed terms between the buyer and the seller. The system also includes an interface screen including a clickable button for, the seller to indicate selection of such offer. Further, the system includes computer program instructions to automatically cause the discounted payment to be effected on a day in the selected set of days.

In another embodiment of the invention, in an electronic system in which payment information is exchanged between buyers and at least a seller, an identification of a date upon which a seller would like to receive early payment is received through a computer input associated with the seller. An identification of the amount of payment the seller would like to receive is also received from the seller. Invoices upon which corresponding offers may be made in order to receive the payment upon the desired date are automatically identified. The invoices do not currently have associated agreed-upon terms that would yield the desired payment at the desired date. Through a portion of the system associated with the buyer, the buyer is offered the discount in exchange for the early payment of the invoices. According to an embodiment of the invention, an identification of a particular buyer is received and the invoices identified are invoices of the particular buyer.

According to an embodiment of the invention, the total payment and total discount for the identified invoices are displayed. A list of the identified invoices may also be displayed to the seller, including, according to an embodiment of the invention, the current payment, discounted payment and discount rate for each respective invoice in the list. Such method may be implemented in the computer implemented business system including computer program instructions and a user interface screen with applicable instructions and applicable input fields to receive the respective information, such as the identification of a date upon which the seller would like to receive the early payment and identification of the amount of payment the seller would like to receive early.

Another embodiment of the invention is directed to a relationship between a buyer and a seller where there is a standard discount term, and there is also a discount term in a respective invoice. An electronic invoice which includes a discount term associated with early payment is received from the seller. The discount term from the invoice is compared with the standard discount term. Payment is then automatically effected from the buyer to the seller based on the more favorable of the discount term from the invoice and the standard discount term. The method may include effecting payment based on a discount term included in a purchase order associated with the transaction, if it is determined the purchase order is more favorable than either of the discount term from the invoice or the standard discount term.

Another embodiment of the invention is directed to a method related to enrollment of a new seller in the system. In an electronic system in which payment information is exchanged between a buyer and a seller, a set of multiple different payment terms which may apply to transactions between a new seller and buyer is presented as a process of enrollment of a new seller. Each payment term includes a discount rate, discount date upon which payment is due to receive the discount, and a net payment due date. After the enrollment, payment is automatically effected from a seller to the buyer based on the selected payment term. If payment is made on a date between the discount date and the net payment date, the discount rate is prorated according to the date upon which the payment is made between the discount date and the net payment date.

BRIEF DESCRIPTION OF THE DRAWINGS

FIG. 5 shows a user interface screen allowing the buyer to edit the PMN information according to an embodiment of the invention.

FIG. 6 shows a user interface screen for a seller with invoices eligible for early payment according to an embodiment of the invention.

FIG. 7 shows a user interface with additional information regarding an invoice eligible for early payment according to an embodiment of the invention.

FIG. 9 shows a process flow related to updating information for a PMN program according to an embodiment of the invention.

FIG. 10 shows a setup user interface for a seller for making early payment offers according to an embodiment of the invention.

FIG. 11 shows a user interface for displaying information to a seller related to the early payment offer according to an embodiment of the invention.

FIG. 12 shows a user interface screen allowing the buyer to edit the early payment terms section of a program according to an embodiment of the invention.

FIG. 15 shows a user interface screen for enrollment of a new seller and a system in which the user may select among different payment terms according to an embodiment of the invention.

DETAILED DESCRIPTION

Figure 1:
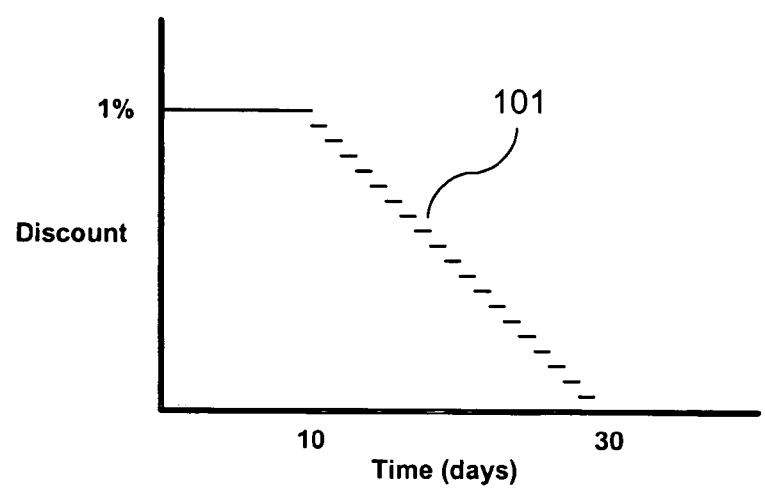
FIG. 1 shows a step curve of adjustable 1%10Net30 terms according to an embodiment of the invention.

An embodiment of the invention is directed to a system for dynamically adjusting the terms of payment in a transaction based on electronic notification of events associated with respective transactions. For example, early payments may be made after receipt of electronic notification of an event such as approval of the respective invoice or release of the payment for the invoice. An offer is made for an adjustment of the terms that apply to payment at a time after the respective event. An entity, such as a buyer, may send requests to a set of entities, such as sellers, for offers of terms different than the established terms between such entity and the respective other entities. After acceptance of an offer, payment is then effected under the newly agreed upon terms.

The buyer and seller may negotiate the new terms for payment based on different factors. For example, based on a simple time value of money based on a selected interest rate calculation, the change in the payment amount can be calculated based on the number of days earlier or later than the originally agreed-upon settlement date that payments occur. An interest rate may be used that is extrapolated from the discount provided in the seller's original terms, or the original terms in the original agreement between the buyer and the seller. For additional description, see United States patent publication System and Method for Varying Electronic Settlements Between Buyers and Suppliers With Dynamic Discount Terms, application Ser. No. 10/155,806, filed May 24, 2002, (now abandoned), publication number US 2003-0020863, publication date Nov. 27, 2003, invented by Don Holm, Duc Lam, and Xuan McRae which is incorporated herein by reference in its entirety.

The following is a description of various embodiments of the invention. Such processes, structures, systems and architectures may be combined with the processes, structures, systems, and architectures described in the above-referenced patent disclosures or implemented separately, according to various embodiments of the invention.

Certain embodiments of the invention are directed to discounts management which help to provide the buyer the capabilities to identify, capture and track early payment discounts.

Basic discount management functionalities may include:
Offer additional early payment terms (better than standard terms) for PO-flip and blank invoice forms,
Immediate early payment "pay me now" ("PMN") on approved invoices that either have no discounts (i.e., Net60) or have missed discounts (i.e., approved past the discounted period),
Normalization of electronic (e-file) terms to the buyer's advantage, and
Early payment offer on a set of invoices from the supplier to the buyer.

E-file terms normalization involves changing the terms on the e-file invoice to the advantage of the buyer. The normalization process takes the best of the submitted invoice terms with the supplier's standard terms. For example, an invoice submitted through e-file has the terms 1%10Net30 while that supplier's standard terms with the buyer are Net60. The normalized terms will be 1%10Net60.

Another place for discounts is in the area of the buyer offering additional early payment terms (presumably better than the supplier's standard terms) for PO-flip and blank invoice. For PO-flip, the supplier can either accept the PO terms or accept any of the newly offered early payment terms. For blank invoices, the supplier can choose from either the standard terms or any of the newly offered early payment terms.

Another place for discounts is the buyer offering early immediate payment ("pay me now," or "PMN") to the suppliers. If invoice terms have no discounts (i.e., Net60), the buyer can offer the supplier PMN options. These are discounts on a declining scale for different days the supplier wants early payment. PMN options can also be offered on approved invoices that have missed discounts. In this scenario, the approval date is past the terms' discount date.

Also, early payment may be offered from the suppliers on a set of invoices. The supplier will make an offer for the total discount amounts desired by a certain date for a set of invoices. In particular, the offer is made on approved invoices only.

Terms

Terms may include: standard terms, early payment terms, PMN terms, and early payment offer terms.
Standard Terms
A vendor will have existing standard terms with a buyer. The standard terms are recorded in the ERP vendor record. A second type of standard terms are those that appear on a purchase order (PO). This might be the same as the terms recorded in the vendor record or they could be provided differently, depending on the PO creation process. In either case, the terms on the PO will be considered as the standard terms for the corresponding invoice automatically created from the PO (invoice flip). The standard terms can be accessed from the database directory associated with the buyers and sellers or from the PO.
Early Payment Terms
Early payment terms are presumably better terms than the standard terms that a buyer is willing to offer to the supplier. These new early payment terms for the supplier are maintained in the database. Early payment terms will be offered in addition to the PO terms (for PO-flip) and the standard terms (for blank invoice).
Normal Early Payment Terms
Use of normal early payment terms is the conventional payment term expressed in the order "discount term/net term." A discount term says what percentage of the bill may be deducted if the invoice is paid within a shorter time interval. A net term says how long the invoice has to be paid in full. For example, payment terms of "1%/10Net30" would be considered early payment terms for suppliers that have standard terms of "Net45."
Adjustable Early Payment Terms
Adjustable early payment terms is a combination of the conventional payment term along with a declining discount rate for the time interval starting at the end of the discount term period and ending with the net term. For example, the terms "Adjustable 1%/10Net30" may look like FIG. 1. According to an embodiment of the invention, the adjustable slope is a step curve 101 with 1 day being the step size as shown in FIG. 1.

The discount rate of decline is the discount term percentage divided by the time interval of the slope. In the above example, the rate of decline is 0.05%/day (i.e., 1%/[30 days–10 days]). The discount percentage on a daily basis would be as follows.

Day 1-10: 1% Discount
Day 11: 0.95% Discount
Day 12: 0.90% Discount
Day . . . : . . . % Discount
Day 29: 0.05% Discount
Day 30: 0% Discount Adjustable early payment terms can also be referred to as ASAP terms. For example, Adjustable 1%/10Net30 may be used as the same as 1%/10Net30 ASAP.

Figure 2A:
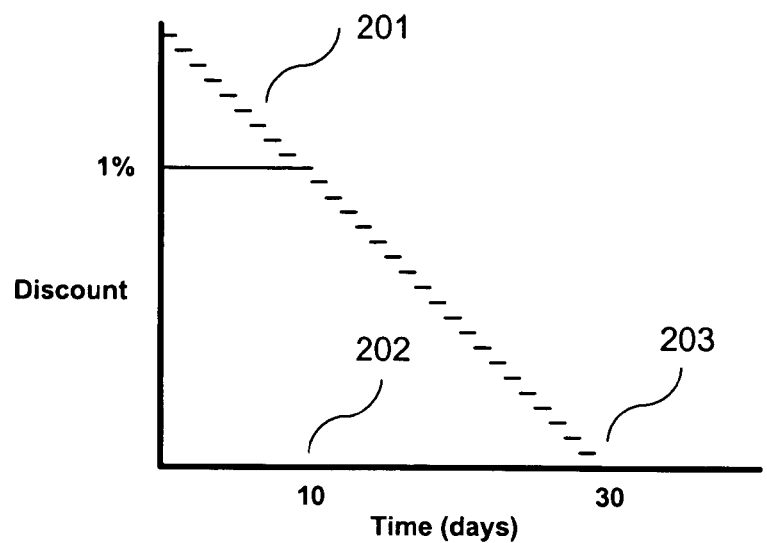
FIG. 2a shows a set of discount offers before the final date the discount is available according to standard terms.

FIG. 2a shows a set of discount offers 201 before the final date 202 that the discount is available according to standard terms (i.e., discount offers for days before day 10—days 1 through 9). Thus, there is an inclining slope from the perspective from day 10 to day 1. The discount rate of incline is the discount term percentage divided by the time interval of the slope, according to an embodiment of the invention. In the above example, the rate of incline is 0.05%/day (i.e., 1%/[10 days–0 days]). The discount percentage on a daily basis would be as follows.

Day 10: 1% Discount
Day 09: 1.05% Discount
Day 08: 1.10% Discount
Day 07: . . . % Discount
Day 02: 1.40% Discount
Day 01: 1.45% Discount
Day 00: 1.50% Discount Adjustable early payment terms with both incline and decline slopes can also be referred to as Extended ASAP (EASAP) terms. For example, Adjustable 1%/10Net30 may be used as the same as 1%/10Net30 EASAP. Thus, according to an embodiment of the invention, early payment is effected in accordance with an additional discount at a time in advance of the final date 202 at which a discount is available according to standard terms, and the additional discount is inversely proportional to the number of days remaining from the day of payment until the final date 202 at which a discount is otherwise available according to the standard terms. For example an additional discount of up to 0.5% is available at day 00 as shown above where the total discount is 1.5%. This additional discount goes down to zero of day 10, where the total discount is 1%. According to another embodiment of the invention, the discount is inversely proportional to the number of days remaining until final due date for payment 203. An example of this may be the combining of the incline and decline slopes described above.

Immediate payment PMN terms can be based on annual hurdle rate, number of calendar days per year, and pay cycle.

The above parameters are used to calculate the discount offers on a per invoice basis. To calculate the discount offers, first determine the daily discount rate:

daily discount rate=annual hurdle rate/number of calendar days per year

Figure 2B:
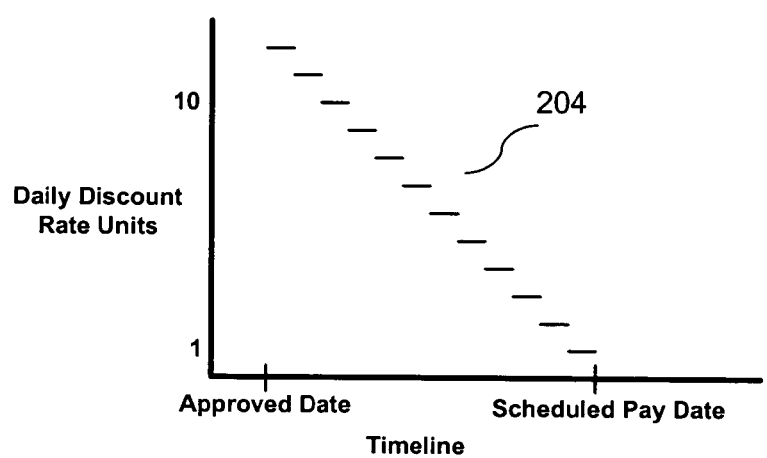
FIG. 2b shows a set of discount offers on the approved date according to an embodiment of the invention.
Figure 3:
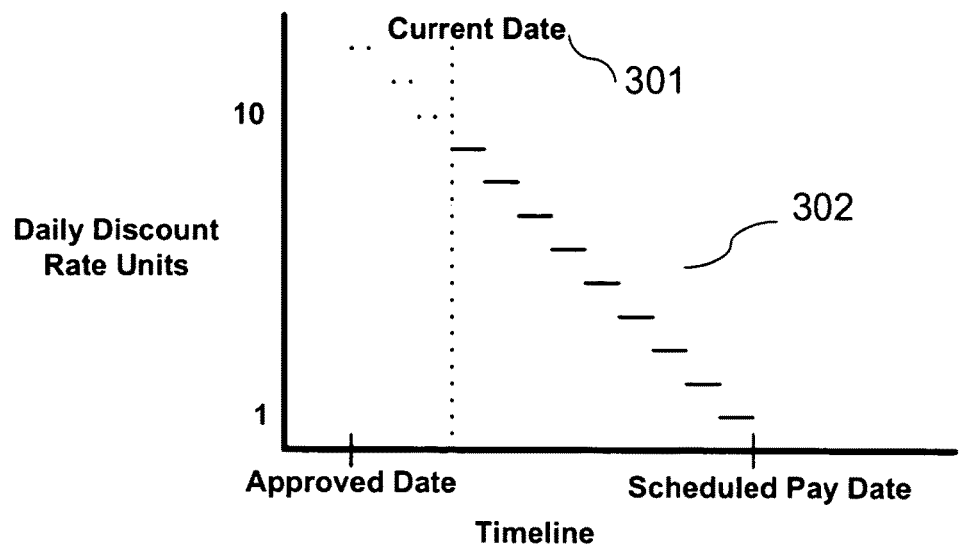
FIG. 3 shows PMN discount offers on a given day according to an embodiment of the invention.

The discount is calculated from the scheduled pay date back to today. The discount is 0 on the scheduled pay date. The discount for each day is calculated as:

discount=invoice amount times number of days until scheduled pay date times daily discount rate FIG. 2b shows the set of discount offers 204 on the approved date. As time passes, the current date 301 moves as shown in FIG. 3. As a result, fewer and fewer discount offers 302 will be available to the supplier as shown in FIG. 3.

Figure 4:
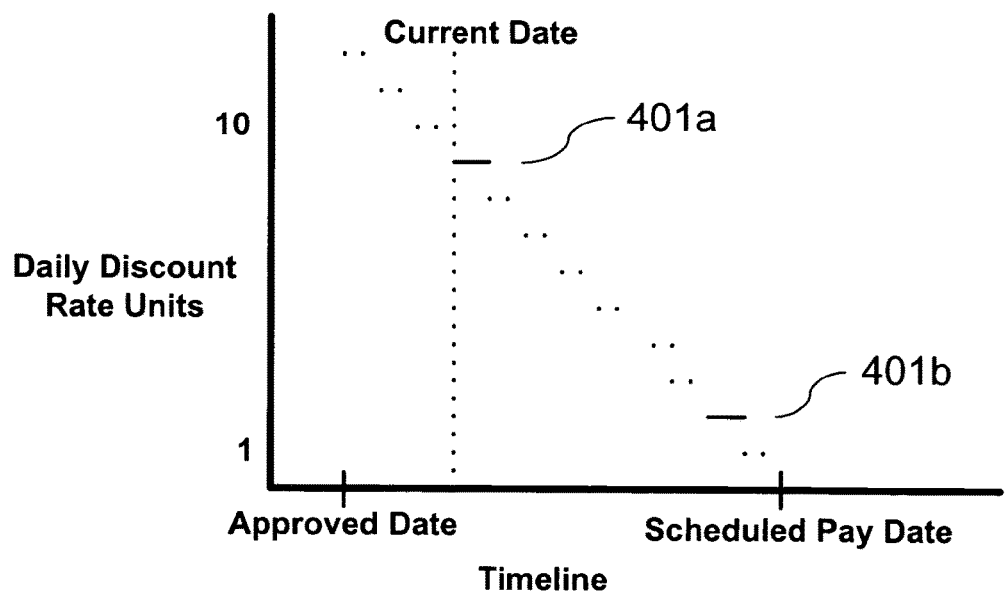
FIG. 4 shows PMN discount offers in line with pay cycle according to an embodiment of the invention.

The discount offers can be continuous daily pay cycle or on a weekly pay cycle. For instance, the buyer existing ERP pay cycle may run every seven days. If the buyer wishes, then the offers can be available only on those days (401a and 401b) as shown in FIG. 4.

PMN offers are made on approved invoices that have no discounts or have missed discounts. Invoices with adjustable terms already have a slope built into them and hence do not have PMN offers.

Example 1: Daily Payment

In this example, the buyer has configured for daily payment:
Buyer's Settings:
Annual hurdle rate: 8%
Number of calendar days: 360
Daily Rate: 0.08/360=0.022
Daily payment
Invoice:
Amount $100
Submitted on: Jan. 1, 2003
Terms: 1%/10Net30
Approved on: Jan. 15, 2003
Scheduled Pay Date: Jan. 31, 2003
On Jan. 15, 2003, the discount offers to the supplier will be:

| Date | Discount Amount |
| --- | --- |
| Jan. 15, 2003 | 100 * 16 * 0.08/360 = $35.60 |
| Jan. 16, 2003 | 100 * 15 * 0.08/360 = $33.33 |
| Jan. 17, 2003 | 100 * 14 * 0.08/360 = $31.11 |
| . . . | |
| Jan. 29, 2003 | 100 * 2 * 0.08/360 = $4.44 |
| Jan. 30, 2003 | 100 * 1 * 0.08/360 = $2.22 |
| Jan. 31, 2003 | 0 |

On Jan. 16, 2003, the discount offers to the supplier will be:

| Date | Discount Amount |
| --- | --- |
| Jan. 16, 2003 | 100 * 15 * 0.08/360 = $33.33 |
| Jan. 17, 2003 | 100 * 14 * 0.08/360 = $31.11 |
| . . . | |
| Jan. 29, 2003 | 100 * 2 * 0.08/360 = $4.44 |
| Jan. 30, 2003 | 100 * 1 * 0.08/360 = $2.22 |
| Jan. 31, 2003 | 0 |

Example 2: Friday Pay Cycle

In this example, the buyer wants to make the PMN offers in line with pay cycle on Friday. Hence, discounts will only be offered on these days.
Buyer's Settings:
Annual hurdle rate: 8%
Number of calendar days: 360
Daily Rate: 0.08/360=0.022
Pay cycle is every Friday
(17th, 24th, 31st)
Invoice:
Amount $100
Submitted on: Jan. 3, 2001
Terms: 1%/10Net30
Approved on: Jan. 15, 2003

Scheduled Pay Date: Jan. 31, 2003

On Jan. 15, 2003, the discount offers to the supplier will be:

| Date | Discount Amount |
|---|---|
| Jan. 17, 2003 | 100 * 14 * 0.08/360 |
| Jan. 24, 2003 | 100 * 7 * 0.08/360 |

On Jan. 24, 2003, the discount offers to the supplier will be:

| Date | Discount Amount |
|---|---|
| Jan. 24, 2003 | 100 * 7 * 0.08/360 |

Early Payment Offer Terms

Terms for an early payment offer include a discount percentage on the total amount of a collection of invoices if payment is made within a pay date. The supplier offers this discount to the buyer. This offer includes multiple invoices combined for payment on a single date. The invoices may have different due dates, and thus the number of days early the payment is to be made, and the effective discount rate, may be different for each invoice. The following is an example:

Pay By Date: Jun. 30, 2002
Invoices Total: $999,342.00
Estimated Payment: $996,210.54
Total Discount: $3,131.46
Average Rate: 0.32%

Buyer Configuration

The buyer may set up configuration information to enable the discount management functionality. The buyer can configure these areas or a subset thereof: early payment terms for PO-flip and blank invoice forms; immediate early payment ("PMN") programs; and/or E-file normalization.

Buyer Discount Programs

The buyer will be able to create new discount programs through the use of a wizard consisting of multiple screens. The discount program may have the following characteristics:

One is created of the special type "default." This program will apply to suppliers not in any other program.
A program applies only to a single supplier group.
A supplier belongs to one program (except the default program).
A program has configuration for all or a subset of the following functionalities: Early payment terms for PO-flip and blank invoice forms; PMN; and/or E-file normalization.
Creation of a new program through a wizard, i.e., multi-screens.

Buyer User Interface

A screen may show the summary view of all the discount programs available to the buyer. From such a screen, the buyer can, according to an embodiment of the invention, click on "New Program" to get a program creation wizard; edit a particular discount program; activate/deactivate functionalities (e.g., PMN, early payment terms, e-file normalization) of a program.

A screen to initiate editing of programs is provided according to an embodiment of the invention. The screen may provide a description of each functionality and the current terms, e.g., PMN with an annual hurdle rate of 7.75% and daily discount rate of 0.021%; supplier discount terms of 1% 10/Net 30; 1.5% 10/Net 45; 2% 10/Net 60; whether e-file normalization is active.

Early Immediate Payment ("PMN")

A screen allowing the buyer to edit the PMN section of a program is shown in FIG. 5. The screen 501 provides inputs for entry of annual hurdle rate 502 and selection of days of the week 503 upon which payment may be made (e.g., Monday, Tuesday, Wednesday, Thursday, Friday, Saturday and Sunday). The screen may also display the daily discount rate 504.

Thus, an embodiment of the invention includes a computer implemented business system comprising computer program instructions for exchanging payment information between at least a buyer and at least a seller, and a user interface screen for the buyer for configuring an offer to the seller of early payment in exchange for a discount of the amount owed. The user interface screen includes a field to receive an annual hurdle rate from the buyer, and a field to receive selection from the buyer of a set of one or more days of the week.

The system includes computer program instructions for presenting the offer to the seller on the seller's user interface at a time when no agreed upon discount is available based on the invoice or pre-agreed terms between the buyer and the seller. The system also includes a user interface screen 601 including a clickable button 602 for the seller to indicate selection of such offer and computer program instructions to automatically cause the discounted payment to be effected on a day in the selected set of days.

The PMN portion of the discount program consists of the following attributes, according to an embodiment of the invention:

Active: Whether to offer PMN in the associated discount program or not.
Annual hurdle rate (%): The annual hurdle rate for all suppliers in this program.
Number of calendar days per year: Use to calculate the daily cost of capital.
Daily cost of capital (computed): The daily cost of capital is computed as annual hurdle rate/calendar days per year. Use the number of calendar days for the year from the general settings.
Discount pay cycle: PMN offers are made on a daily basis or on days specified by the pay cycle.
Apply to net terms: This attribute will determine whether to only offer PMN for invoices with only net terms.

The discount pay cycle will determine which days to make PMN offer on. It is based on the schedule for the pay cycle. If the schedule is for the pay cycle to be daily, offers will be made for payment on every banking business day. If the schedule is for the pay cycle to be weekly, offers will be made for payment on selected days. If the actual date is on a banking holiday, no offer will be made for payment on that day. The system provides the buyer the opportunity to select the respective day or days of the week upon which the payment is to be made.

PMN options are available on approved invoices that have:

Missed discounts, i.e., invoice approved after discount due date, AND
The supplier for that invoice belongs in a discount program where the PMN section is active.

General Process Flow

The general process flow of PMN is:

1. Invoice approved status upload from ERP to system.
2. Figure out which "program" the invoice falls into.

3. Generate and save the offers on the disburser side (buyer system).

4. Send the "program" details/offers for the invoice to the collector (seller system).

5. Collector receives invoice's program details.

6. Generate and save the offers on the collector side.

7a. Supplier does not accept PMN. Invoice will be paid through normal process. End of process.

7b. Supplier accepts PMN.

8. Offer acceptance message to disburser.

9. Disburser schedule early payment for invoice.

10. Disburser back office swipes through all scheduled early payment invoice. Activate early payment issuance instruction to the ERP system.

The following is the flow between states related to PMN status. The status "INI" (initial) is reached when the offer is made. The disburser back office will generate the offer and save this status. This will be sent to the collector side as well. When the supplier accepts an offer from the collector user interface, the status will be changed to "ACP" for acceptance. When the invoice is paid, then the status will be changed to "PD" for paid. If no offer is accepted, the status will be changed to "EXP" when the invoice paid status is processed on the collector side.

FIG. 6 shows a user interface 601 for a seller with invoices eligible for early payment. Thus, the system may include a user interface screen for the seller including a list of invoices 603 for which the buyer and any other buyers have offered the seller early payment in exchange for a discount of the amount owed at a time when no agreed upon discount is available based on the invoice or pre-agreed terms between the buyer and the seller. The user interface also includes clickable buttons 604, each in proximity to the indication of each invoice, for the seller to indicate interest in the corresponding offer.

When the supplier clicks on the "Pay Me Now" button, the next screen will show the first early payment day and the associated discount rate. The supplier can confirm to accept this early payment date or click on "More Options" to see the complete list of early payment days.

If the supplier clicks on the "More Options," the supplier will be presented with another screen 701, the complete list 702 of all early payment days and associated discount rates as shown in FIG. 7. The supplier can "Select" 703 to accept a respective early payment day.

Early Payment Discount Offer by Seller

In addition to accepting the early immediate payment PMN terms offered by the buyer, the supplier can make an early payment discount offer on a set of approved invoices. A screen in the seller's user interface may include the "Early Payment Offer" button. The "Early Payment Offer" button may be available on early payment screens.

Figure 8:
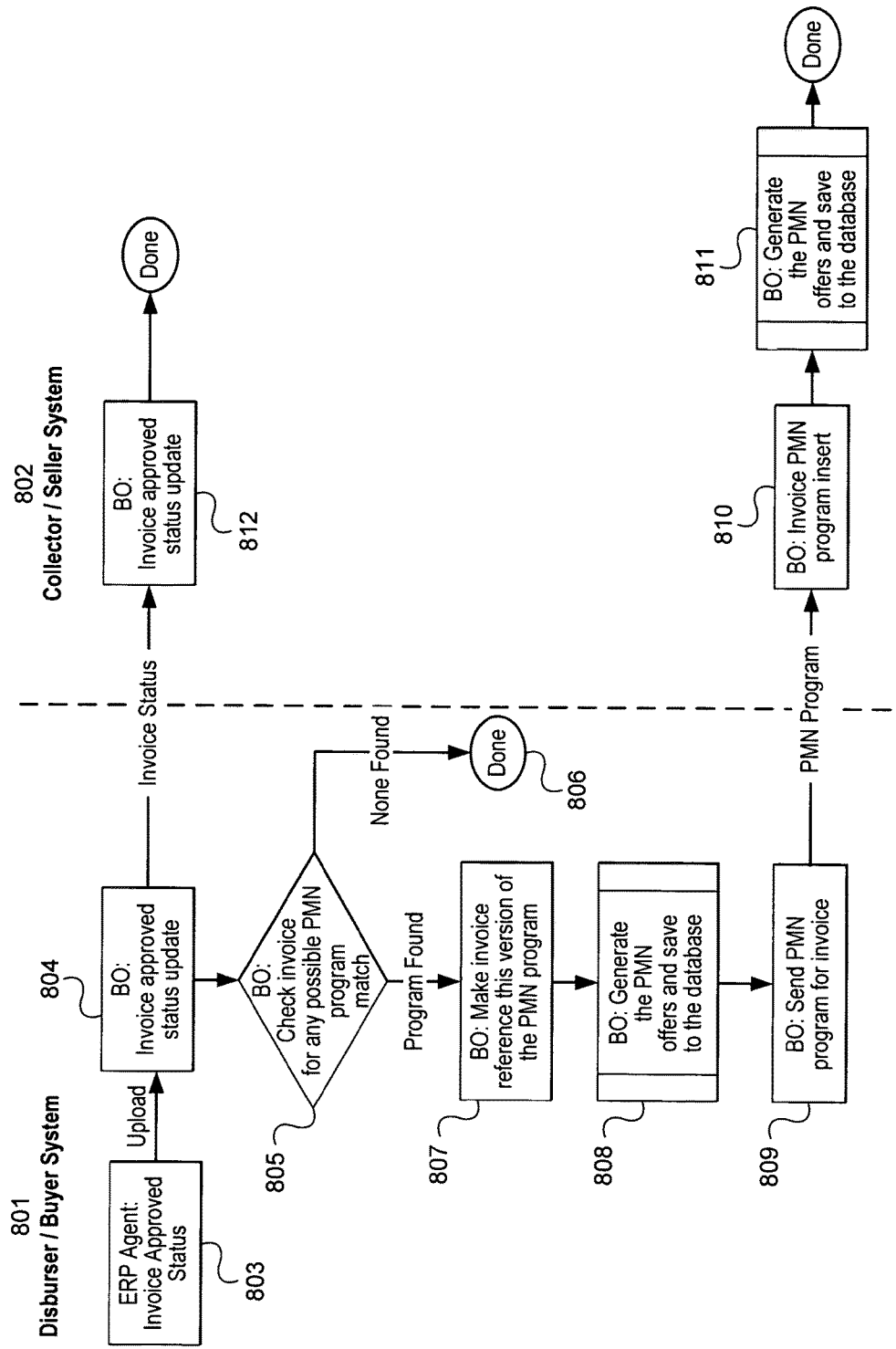
FIG. 8 shows a process flow related to PMN offers according to an embodiment of the invention.

FIG. 8 shows a process flow related to PMN offers according to an embodiment of the invention. The process flow includes actions taking place in the disburser/buyer system 801 and in the collector/seller system 802. In an ERP agent, an invoice is approved (block 803), and then this information is uploaded to buyer system 801 (block 804). The status is updated on the collector/seller system 802 (block 812). Note that blocks 804-809 and 812, 810 and 811 are back office processes (BO). As seller system 802 is informed of the invoice approved status (block 812), seller system 802 can check for the presence of a PMN program.

Buyer system 801 checks whether the invoice matches any PMN program (block 805). If no PMN program is found, the process is completed (block 806). If the invoice matches a PMN program, the invoice is caused to reference this version of the PMN program (block 807). PMN offers are generated and saved to the database (block 808), and a PMN program is sent for an invoice (block 809). A PMN message is sent from buyer system 801 to collector system 802. The invoice is referenced in seller system 802 (block 810), and PMN offers are generated and saved to the database (block 811).

FIG. 9 shows a process flow related to updating information for a PMN program according to an embodiment of the invention. Thus, this figure shows an approach that the system may take after a PMN offer has been generated for an invoice and the buyer changes information in a discount program information. The system looks for existing invoices with offers, and regenerates these.

Thus, FIG. 9 shows communication between buyer (disburser) system 901 and seller (collector) system 902 starting with a PMN program change (block 903). The program change takes place at the application level (APP). Other processes shown are back office processes (e.g., block 904). The invoices in the program are found in buyer system 901 (block 904), and the invoice status is updated to seller system 902 (block 919). If invoices are found (block 905) on buyer system 901, the respective invoices are caused to reference this version of the PMN program (block 906). PMN offers are generated and saved to the database (block 907), and an update of the PMN program is sent from buyer system 901 to seller system 902 (block 908). Seller system 902 receives this update and processes a PMN update on seller system 902 (block 909). Seller system 902 finds prior version invoices in the PMN program (blocks 910 and 911), and determines whether the supplier has accepted an offer on a previous version of a PMN program (block 912). If the supplier has accepted such an offer, the process is ended with an exception (block 914).

If supplier has not accepted such an offer, the PMN program is updated for the invoice (block 915), and PMN offers are generated and saved to the database (block 916). Next, seller system 902 sends a PMN program update commit for the respective invoices (block 917), and buyer system 901 receives this update (block 918).

According to an embodiment of the invention, the supplier will see the screen 1001 shown in FIG. 10 upon clicking on the "Early Payment Offer." Here, the supplier can choose the buyer 1002 to make the offer to, the date payment would like to be received 1003, the total amount to collect 1004, and the desired annual cost of capital 1005.

Thus, an embodiment of the invention includes a user interface screen for configuring offers to sellers of discounts in exchange for early payment including a field for identification of a date upon which the seller would like to receive the early payment and a field for identification of the amount of payment the seller would like to receive early. The system also includes computer program instructions for automatically identifying invoices upon which corresponding offers may be made in order to receive the payment upon the desired date. The invoices do not currently have associated agreed-upon terms that would yield the desired payment at the desired date. The system further includes computer program instructions for offering to the buyer the discount in exchange for the early payment.

For the specified total amount that the supplier would like to be collected and desired annual cost of capital, the system determines which invoices 1101 will be part of this offer. This is displayed as shown in FIG. 11. The actual total amount 1102 and total discount 1103 are displayed. The actual amount 1104 and discount 1105 are displayed at the invoice level.

A screen 1201 allowing the buyer to edit the early payment terms section of a program is shown in FIG. 12. This screen allows the user to activate or de-activate the program, for example through a clickable selection 1202. Terms can be selected through a window 1203 and displayed in another window 1204.

Buyer New Discount Program Wizard

A first page of a wizard may allow the buyer to choose the supplier group for this program. A second step of the wizard may provide configuration of a PMN function.

A third step of the wizard may allow for configuration of the early payment terms for PO-flip and blank invoice forms. Supplier discount terms allow approved suppliers to select from a list of buyer approved discount terms while creating an invoice. Available discount terms are selected from a box, and selected terms are shown in a neighboring box.

The fourth step of the wizard may allow for configuration of the e-file normalization section.

Early Payment Terms for PO-Flip and Blank Invoice Forms

The buyer will be able to turn on or off the availability of early payment terms for PO-flip and blank invoice form for a discount program. Additionally, the buyer will be able to define the list of terms as well.

The early payment terms portion of the discount program has the following attributes:
  Active: Whether the early payment terms portion is active for program.
  List of Terms: The terms that will be offered in this program.

In the user interface, the buyer can check/uncheck the flag (e.g. "active") to make early payment terms active/inactive for the associated discount program. The buyer will be able to add or remove terms from the selected list in the user interface.

E-File Normalization

An embodiment of the invention is directed to "e-file normalization." The user interface allows activation of e-file normalization. The e-file normalization screen will show the active flag. The buyer can check/uncheck the checkbox.

E-File Discount Capture

The e-file discount functionality is normalizing the submitted invoice terms and the supplier's standard terms to the buyer's advantage. Normalization is done by taking the better of both discount (if any) terms and net components of the payment terms. These normalized terms will be saved in the existing invoice terms field. A new field will be created to store the submitted e-file terms.

Thus, in an electronic system in which payment information is exchanged between a buyer and a seller, an electronic invoice is received from the seller, the system has a stored standard discount term with respect to transactions between the buyer and seller, and the invoice includes a discount term associated with early payment. The discount term from the invoice is compared with the standard discount term, and payment from the buyer to the seller is automatically effected based on the more favorable of the discount term from the invoice and the standard discount term.

The following is the set of rules to follow during normalization executed in this order:
  Any potential discount is better than no discount.
  A higher discount is better than a lower discount.
    The higher discount terms will be taken as a whole.
      There is no normalization of the discount periods.
  If the discount is the same, take the one with the longer discount period.
  A longer net term is better than a shorter net term.

Which "standard terms" to normalize will be based on the following set of rules:
  If the invoice has a PO, then normalize with the PO terms.
  If a default system invoice posting matched found against remit address, then normalize with the standard terms of that system record.
  Otherwise, normalize with all accepted and matched system standard terms with that remit address.

Figure 13:
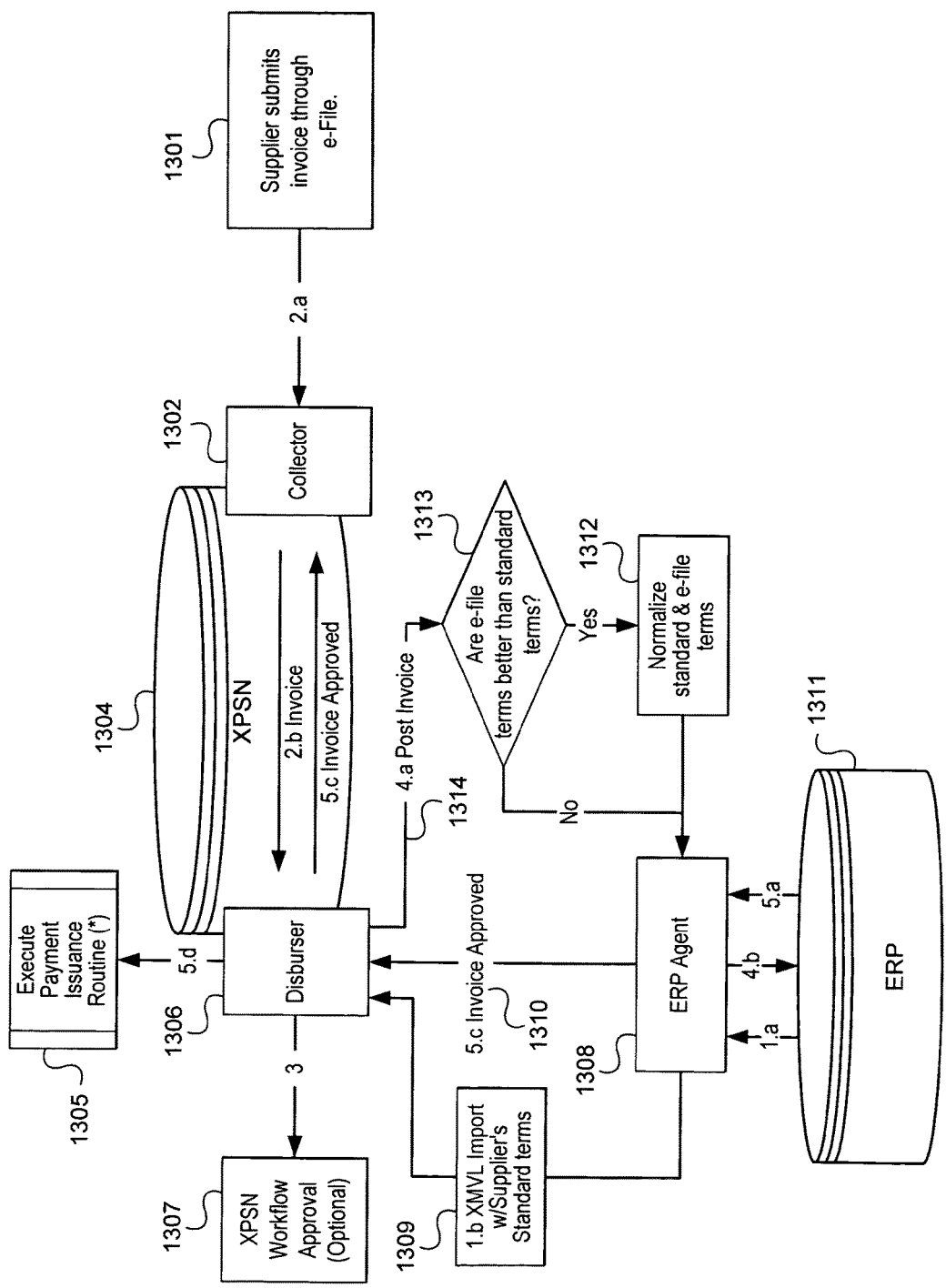
FIG. 13 shows a flow diagram for a system including e-file according to an embodiment of the invention.

FIG. 13 shows a flow diagram for a system including e-file according to an embodiment of the invention. Information about respective vendors is loaded into the system from an ERP system database 1311 through ERP agent 1308 (line 1310). When the invoice is approved, it is posted to the ERP system database 1311 through ERP agent 1308. Before it is posted, the normalization process as shown takes place: Standard terms are uploaded from ERP system 1311 (block 1309). An invoice is submitted (block 1301) and received in the seller system (block 1302). The system, through a central storage system (block 1304), provides information regarding the invoice to the buyer system (block 1306). A work flow approval process may be involved (block 1307).

The invoice is posted (line 1314). If the e-file terms (those terms on the invoice) are better than the standard terms negotiated between the buyer and the seller (block 1313), then the better of those terms are selected and used (block 1312). These terms are then provided to the ERP agent (block 1308) and used in the transaction. The payment is executed through the disburser (block 1306), and payment is executed (block 1305).

Early Payment Issuance

According to embodiments of the invention, the system will ensure prompt discounted payment issuance. One method is issuance against the discounted portion of the terms. If an invoice is approved within the discount terms period, the system will issue a manual payment request to the ERP system for the full discounted amount as specified by the conventional portion of the terms. This request will be issued at the end of the discount period compensating for ACH processing time. Upon success of the request, the payment will be applied to the invoice at the full discounted amount in the ERP system. Once that is complete, the system will then issue the actual payment to the supplier. This is an atomic transaction that will occur within one day. Hence, the order of operations might change.

Another method is issuance against a non-conventional portion of the terms, i.e., adjustable portion, PMN, and early payment discount offer. If an invoice is approved outside the conventional discount terms period, the XPSN will issue a manual payment request to the ERP system for the adjusted discount amount. This request will be issued on the adjusted date for the discount compensating for ACH processing time. Upon success of the request, the XPSN will issue a credit memo for the discount amount and post this credit memo to the ERP system. The payment will then be applied to the full amount of the invoice and the full amount of the credit memo, thereby bringing the net balance to 0. This is an atomic transaction that will occur within one day. Hence, the order of operations might change.

For invoices approved during the net terms, the system will NOT issue early payment for these cases by default. However, the buyer can configure the system to do so, thereby ensuring early payment without waiting for the ERP pay cycle.

Normal Early Payment Terms Payment Issuance

If the invoice with these terms is approved within the discounted period, the system will issue an early payment at the end of the period. For the period between net term and end of discount term, the buyer will configure whether the system will issue an early payment on the approved date. If the invoice is approved outside the net term, the payment will be issued through the ERP pay cycle.

For example, an invoice is submitted with 1%10Net30 terms on Jan. 1, 2003. The scheduled pay date for this invoice will be Jan. 30, 2003. If the invoice is approved any day before Jan. 10, 2003, the payment will be issued on Jan. 10, 2003. If the invoice is approved between Jan. 10, 2003 through Jan. 30, 2003, there are two scenarios. If the buyer configures the system to issue early payment for that period, payment will be issued on the approved date. Otherwise, the payment will be issued by the ERP pay cycle. The actual payment date will then be after the scheduled pay date. If the invoice is approved after the net terms, the ERP pay cycle will issue the payment, which will be after the scheduled pay date as well.

Adjustable Early Payment Terms Payment Issuance

If the invoice with these terms is approved within the conventional discounted period, the system will issue an early payment at the end of the period. For the period between the net term and the end of discount term, the system will issue an early payment on the approved date. If the invoice is approved outside the net term, the payment will be issued through the ERP pay cycle.

For example, an invoice is submitted with Adjustable 1%10Net30 on Jan. 1, 2003. The scheduled pay date for this invoice will be Jan. 30, 2003. If the invoice is approved any day before Jan. 20, 2003, the payment will be issued on Jan. 10, 2003. If the invoice is approved between Jan. 20, 2003 through Jan. 30, 2003, the XPSN will issue payment on the approved date. If the invoice is approved after the net terms, the ERP pay cycle will issue the payment, which will be after the scheduled pay date.

Figure 14:
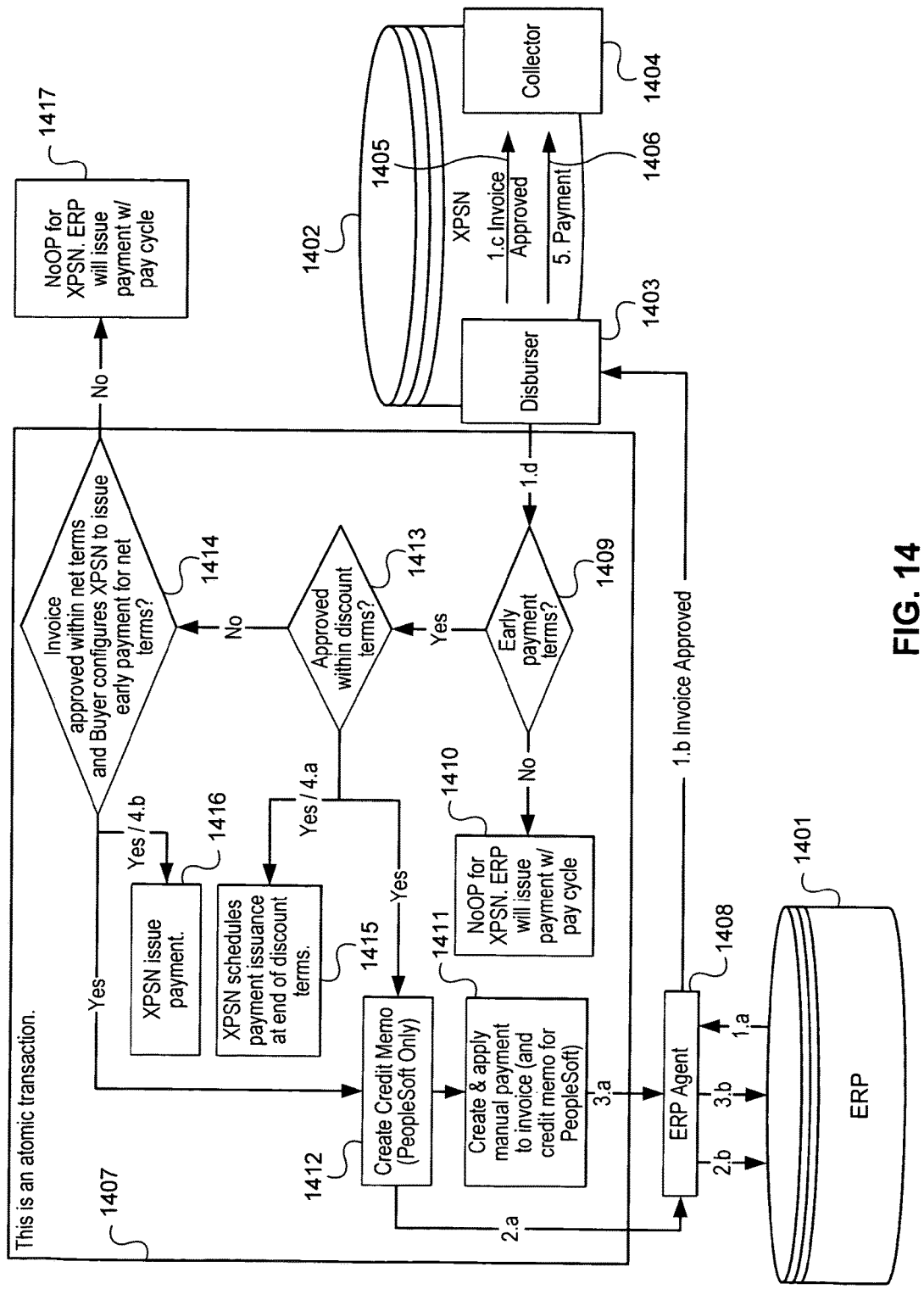
FIG. 14 shows a flow diagram for general payment issuance according to an embodiment of the invention.

FIG. 14 shows a flow diagram for general payment issuance according to an embodiment of the invention. This process flow includes communication between disburser/buyer system 1403 and collector/seller system 1404. The invoice is approved at disburser 1413 and an appropriate notification (notification 1405) is sent to collector 1404. After the appropriate processes are run, payment is made from disburser/buyer system 1403 to collector/seller system 1404 (notification 1406). A database system and computer system 1402 facilitate this communication.

If no early payment terms are applicable (block 1409), then no particular action is taken for this process, and the ERP system issues payment with the normal pay cycle (block 1410). If there are early payment terms (block 1409), and the invoice has been approved within the discount terms (block 1413), then determine whether the invoice has been approved within the net terms and the buyer has configured the system to issue early payment for net terms (block 1414). If this is not the case, no additional action is taken in this process, and the ERP system issues payment with the normal payment cycle (block 1417). Otherwise, payment is issued within this process (block 1416), and a credit memo may be issued (block 1412). As appropriate, manual payment is created and applied to the invoice (block 1411), and the ERP agent 1408 interacts with the ERP system 1401 to cause the appropriate action to be taken by ERP system 1401. If the invoice is approved within the discount terms (block 1413), the system schedules payment issuance at the end of the discount terms (block 1415), and a credit memo is created if applicable (block 1412).

Enrollment and Terms

During the supplier enrollment process, the buyer can offer each supplier all the different types of discount terms described in this document as shown in FIG. 15. Thus, according to an embodiment of the invention, in the process of an enrollment of a new seller in the system, a set including multiple different payment terms 1502 which may apply to transactions between the new seller and buyers is presented, for example on a user interface screen 1501. Each payment term includes a discount rate, discount date upon which payment is due to receive the discount, and a payment due date. After the enrollment, payment is automatically effected from the seller to the buyer based on the selected payment term. If such payment is made on a date between the discount date and the net payment date, discount rate is prorated according to the date upon which the payment is made between the discount date and the net payment date.

The description herein of various embodiments of the invention has been presented for purposes of illustration and description. It is not intended to limit the invention to the precise forms described.

What is claimed is:

1. A computer-implemented method for managing discounts through interfacing with a seller system, a buyer system, and an enterprise resource management (ERP) system, the method comprising:

receiving from the ERP system, at a programmed computer, electronic payment information exchanged between the buyer system and the seller system over a network;

providing a seller user interface for display on the seller system, the seller user interface enabling formulation of early payment offers for multiple invoices, the seller user interface including selectable parameters including a buyer selection, an early payment date selection, and a payment amount selection, wherein the multiple invoices comprise at least a standard invoice based on standard payment terms and an e-file invoice based on e-file payment terms;

receiving, at the programmed computer, through seller selection at the seller user interface, an identification of a desired early payment date, a desired payment amount, and a particular buyer;

identifying, by the programmed computer, invoices for the particular buyer eligible to receive corresponding offers for a discount, wherein eligibility is based on the desired payment date and the desired payment amount identified by the seller, and wherein the identified invoices do not currently have associated agreed-upon terms that would yield the desired payment amount on the desired payment date;

generating a list of the identified invoices for the particular buyer selected through the seller user interface;

displaying an interactive version of the generated list on an early payment summary seller user interface, the interactive version of the generated list enabling seller confirmation of the early payment offers for the identified invoices, the interactive list comprising a current payment due, a discount payment offered, and a discount rate for each of the identified invoices, wherein the discount rate is based on a daily discount rate calculated as an annual hurdle rate divided by a number of calendar days per year;

transmitting, by the programmed computer, to the buyer system of the particular buyer, offers for the discount in exchange for the early payment of a plurality of the identified invoices confirmed by the seller, the discounts offered satisfying the desired payment amount on the desired payment date identified by the seller, the offers displayed on a buyer user interface viewable by the buyer;

displaying, by the buyer user interface, a summary view of all discount programs available to the buyer including corresponding selectable icons displaying an icon for a new discount program, an icon for editing the discount rate for each of the identified invoices, and an icon for activating or deactivating e-file normalization;

analyzing, at the buyer system, the offers confirmed by the seller to determine net components of payment terms of the plurality of the identified invoices, identify e-file payment terms and standard payment terms of the plurality of the identified invoices, and normalize the identified e-file terms and the identified standard terms by activating the icon for the e-file normalization, wherein the e-file normalization involves changing the e-file payment terms on the e-file invoice to an advantage of the buyer; and automatically effecting payment from the buyer system to the seller system based on the normalized terms.

2. The method of claim 1, further comprising receiving an identification of a cost of capital from the seller, wherein the identifying of invoices upon which corresponding offers may be made comprises identifying invoices based on the cost of capital identified.

3. The method of claim 1, further comprising displaying a total payment amount and a total discount amount for the identified invoices.

4. The method of claim 1, further comprising providing a selectable early payment offer button on the seller user interface.

5. The method of claim 1, wherein the seller selections define a program change and the programmed computer causes invoices found on the buyer system to reference the program change.

6. The method of claim 1, wherein normalization comprises the following set of rules:
- any potential discount is selected over no discount;
- a higher discount is selected over a lower discount;
- if the discount is the same, select the discount with a longer discount period;
- a longer net term is selected over a shorter net term.

7. A computer system for managing discounts through interfacing with a seller system, a buyer system, and an enterprise resource management (ERP) system, the computer system, comprising:
- a memory;
- a processing device communicatively coupled to said memory, said processing device configured to:
- receive payment information exchanged between buyers and sellers from the ERP system;
- provide a seller user interface for display on the seller system, the seller user interface enabling formulation of early payment offers for multiple invoices, the seller user interface including selectable parameters including a buyer selection, an early payment date selection, and a payment amount selection, wherein the multiple invoices comprise at least a standard invoice based on standard payment terms and an e-file invoice based on e-file payment terms;
- receive an identification through seller selection at the seller user interface, of a desired early payment date, a desired payment amount, and a particular buyer;
- identify invoices for the particular buyer eligible to receive corresponding offers for a discount, wherein eligibility is based on the desired payment date and the desired payment amount identified by the seller, and wherein the identified invoices do not currently have associated agreed-upon terms that would yield the desired payment amount on the desired payment date;
- generate a list of identified invoices for the particular buyer selected through the seller user interface;
- display an interactive version of the generated list comprising a current payment due, a discount payment offered, and a discount rate for each of the identified invoices, said list displayed on an early payment summary seller user interface, the interactive version of the generated list enabling seller confirmation of the early payment offers for the identified invoices, wherein the discount rate is based on a daily discount rate calculated as an annual hurdle rate divided by a number of calendar days per year;
- transmit to the buyer system of the particular buyer offers for the discount in exchange for the early payment of a plurality of the identified invoices confirmed by the seller, the discounts offered satisfying the desired payment amount on the desired payment date identified by the seller, the offer displayed on a buyer user interface viewable by the buyer;
- display, by the buyer user interface, a summary view of all discount programs available to the buyer including corresponding selectable icons displaying an icon for a new discount program, an icon for editing the discount rate for each of the identified invoices, and an icon for activating or deactivating e-file normalization;
- analyze the offers confirmed by the seller to determine net components of payment terms of the plurality of the identified invoices;
- identify e-file payment terms and standard payment terms of the plurality of the identified invoices;
- normalize the identified e-file terms and the identified standard terms by activating the icon for the e-file normalization, wherein the e-file normalization involves changing the e-file payment terms on the e-file invoice to an advantage of the buyer; and
- automatically effect payment from the buyer system to the seller system based on the normalized terms.

8. The system of claim 7, wherein the processing device provides a selectable early payment offer button on the seller user interface.

9. The system of claim 7, wherein the seller selections define a program change and the processing device causes invoices found on the buyer system to reference the program change.

10. The system of claim 7, wherein normalization comprises the following set of rules:
- any potential discount is selected over no discount;
- a higher discount is selected over a lower discount;
- if the discount is the same, select the discount with a longer discount period;
- a longer net term is selected over a shorter net term.

* * * * *